United States Patent
Wang

(10) Patent No.: US 9,379,868 B2
(45) Date of Patent: Jun. 28, 2016

(54) SUBSEQUENT ASSOCIATION IDENTIFIER (AID) UPDATE WITHIN SINGLE USER, MULTIPLE USER, MULTIPLE ACCESS, AND/OR MIMO WIRELESS COMMUNICATIONS

(75) Inventor: Qi Wang, San Francisco, CA (US)

(73) Assignee: BROADCOM CORPORATION, Irvine, CA (US)

( * ) Notice: Subject to any disclaimer, the term of this patent is extended or adjusted under 35 U.S.C. 154(b) by 530 days.

(21) Appl. No.: 13/563,064

(22) Filed: Jul. 31, 2012

(65) Prior Publication Data

US 2013/0142184 A1    Jun. 6, 2013

Related U.S. Application Data

(60) Provisional application No. 61/567,020, filed on Dec. 5, 2011.

(51) Int. Cl.
| | |
|---|---|
| *H04L 5/00* | (2006.01) |
| *H04L 1/00* | (2006.01) |
| *H04L 1/06* | (2006.01) |

(52) U.S. Cl.
CPC ............ *H04L 5/0053* (2013.01); *H04L 1/0065* (2013.01); *H04L 1/0625* (2013.01); *H04L 1/0016* (2013.01); *H04L 1/0668* (2013.01)

(58) Field of Classification Search
CPC ... H04W 84/12; H04L 5/0053; H04L 1/0065; H04L 1/0625; H04L 1/0016; H04L 1/0668
See application file for complete search history.

(56) References Cited

U.S. PATENT DOCUMENTS

| 7,200,134 | B2* | 4/2007 | Proctor, Jr. | ......... H04B 7/15528 370/310 |
| 7,756,473 | B2* | 7/2010 | Seo | ........................ H04L 25/242 455/16 |
| 7,990,904 | B2* | 8/2011 | Proctor, Jr. | ............. H04B 7/026 370/315 |
| 8,363,590 | B2* | 1/2013 | Mathews | ...................... 370/315 |
| 2003/0081628 | A1* | 5/2003 | Sugar | .................. H04L 12/5695 370/461 |
| 2005/0030945 | A1* | 2/2005 | Sarikaya | ........... H04L 29/12311 370/389 |
| 2005/0256963 | A1* | 11/2005 | Proctor Jr. | .......... H04B 7/15528 709/230 |

(Continued)

*Primary Examiner* — Andrew Lai
*Assistant Examiner* — Hoyet H Andrews
(74) *Attorney, Agent, or Firm* — Garlick & Markison; Shayne X. Short

(57) ABSTRACT

Subsequent association identifier (AID) update within single user, multiple user, multiple access, and/or MIMO wireless communications. Even while a given communication device maintains continuous association within a given communication system, a unique identifier associated with that particular communication device may be updated. For example, considering and implementation including an access point (AP) and a number of wireless stations (STAs), even while at least some of the STAs remain in association with the AP, the respective unique identifiers associated with one or more of those STAs may be updated (e.g., the respective AID values associated with one or more of those STAs may be updated). For example, after an initial assignment of unique identifiers associated with a group of respective communication devices within the communication network, the unique identifier associated with one or more of those respective communication devices may be updated or changed after the initial assignment.

20 Claims, 26 Drawing Sheets

(56) References Cited

U.S. PATENT DOCUMENTS

| | | | | |
|---|---|---|---|---|
| 2006/0098592 | A1* | 5/2006 | Proctor Jr. | H04B 7/026 370/315 |
| 2006/0218298 | A1* | 9/2006 | Knapp | H04L 45/00 709/238 |
| 2006/0285517 | A1* | 12/2006 | Kakani | H04W 72/1257 370/329 |
| 2007/0275746 | A1* | 11/2007 | Bitran | H04W 16/14 455/509 |
| 2008/0279163 | A1* | 11/2008 | Desai | H04W 52/267 370/338 |
| 2008/0279264 | A1* | 11/2008 | Desai | H04W 16/14 375/220 |
| 2009/0040965 | A1* | 2/2009 | Matsuo | H04W 76/04 370/328 |
| 2009/0129367 | A1* | 5/2009 | Bitran | H04W 72/1257 370/350 |
| 2009/0323611 | A1* | 12/2009 | Singh | H04W 74/0875 370/329 |
| 2010/0061334 | A1* | 3/2010 | Gault | H04L 5/0005 370/330 |
| 2010/0080183 | A1* | 4/2010 | Mishra | H04L 43/028 370/329 |
| 2010/0152869 | A1* | 6/2010 | Morrison | G06Q 10/0637 700/96 |
| 2010/0161728 | A1* | 6/2010 | Drozt | G06Q 10/10 709/204 |
| 2010/0165910 | A1* | 7/2010 | Mathews | H04B 7/15528 370/315 |
| 2010/0202391 | A1* | 8/2010 | Palanki | H04W 72/0426 370/329 |
| 2010/0220679 | A1* | 9/2010 | Abraham | H04W 74/06 370/329 |
| 2010/0226317 | A1* | 9/2010 | Horn | H04W 16/10 370/329 |
| 2010/0265864 | A1* | 10/2010 | He | H04W 68/025 370/311 |
| 2010/0284381 | A1* | 11/2010 | Hirsch | H04L 1/0002 370/338 |
| 2010/0290398 | A1* | 11/2010 | Choudhary | H04L 12/465 370/328 |
| 2011/0096796 | A1* | 4/2011 | Zhang | H04B 7/0669 370/474 |
| 2011/0134821 | A1* | 6/2011 | Kakani | H04W 72/1257 370/311 |
| 2012/0021755 | A1* | 1/2012 | Chin | H04W 76/025 455/450 |

\* cited by examiner

• traffic indication map (TIM) information element (IE) format

• power save (PS)-poll frame format

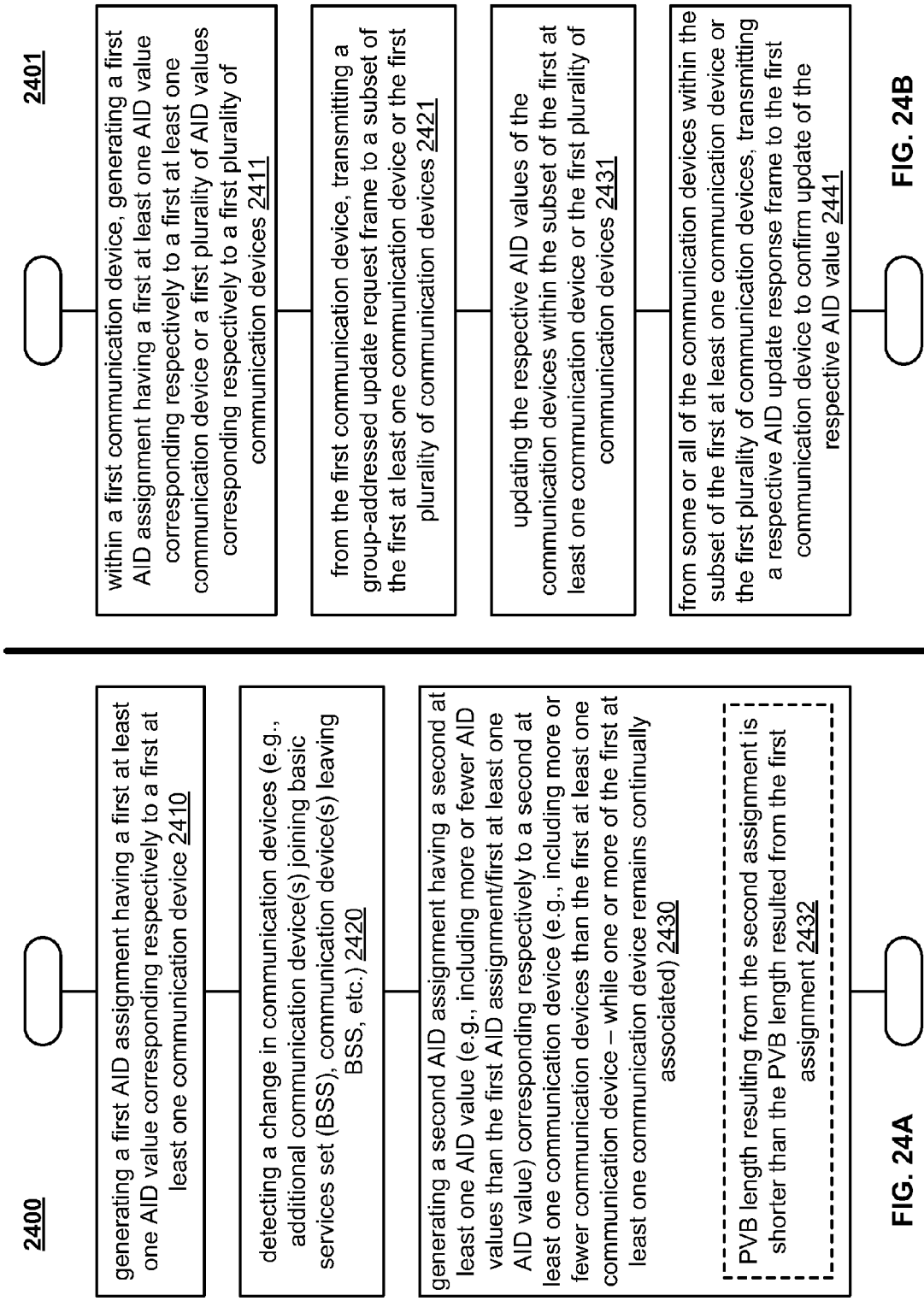

SUBSEQUENT ASSOCIATION IDENTIFIER (AID) UPDATE WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:

1. U.S. Provisional Patent Application Ser. No. 61/567,020, entitled "Subsequent association identifier (AID) update within single user, multiple user, multiple access, and/or MIMO wireless communications," (Attorney Docket No. BP24289), filed Dec. 5, 2011, pending.

INCORPORATION BY REFERENCE

The following IEEE standards/draft standards are hereby incorporated herein by reference in their entirety and are made part of the present U.S. Utility patent application for all purposes:

1. IEEE Std 802.11™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™-2012, (Revision of IEEE Std 802.11-2007), 2793 total pages (incl. pp. i-xcvi, 1-2695).

2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 total pages (incl. pp. i-xxxii, 1-502).

3. IEEE Draft P802.11-REVmb™/D12, November 2011 (Revision of IEEE Std 802.11™-2007 as amended by IEEE Std 802.11k™-2008, IEEE Std 802.11r™-2008, IEEE Std 802.11y™-2008, IEEE Std 802.11w™-2009, IEEE Std 802.11n™-2009, IEEE Std 802.11p™-2010, IEEE Std 802.11z™-2010, IEEE Std 802.11v™-2011, IEEE Std 802.11u™-2011, and IEEE Std 802.11s™-2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

4. IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

5. IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

6. IEEE Std 802.11ae™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™-2012, (Amendment to IEEE Std 802.11™-2012), 52 total pages (incl. pp. i-xii, 1-38).

7. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

BACKGROUND OF THE INVENTION

1. Technical Field of the Invention

The invention relates generally to communication systems; and, more particularly, it relates to coordination among various communication devices within single user, multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802, 11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications.

However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIG. 22, FIG. 23A, FIG. 23B, FIG. 24A, FIG. 24B, FIG. 25A, FIG. 25B, and

DETAILED DESCRIPTION OF THE INVENTION

Figure 1:
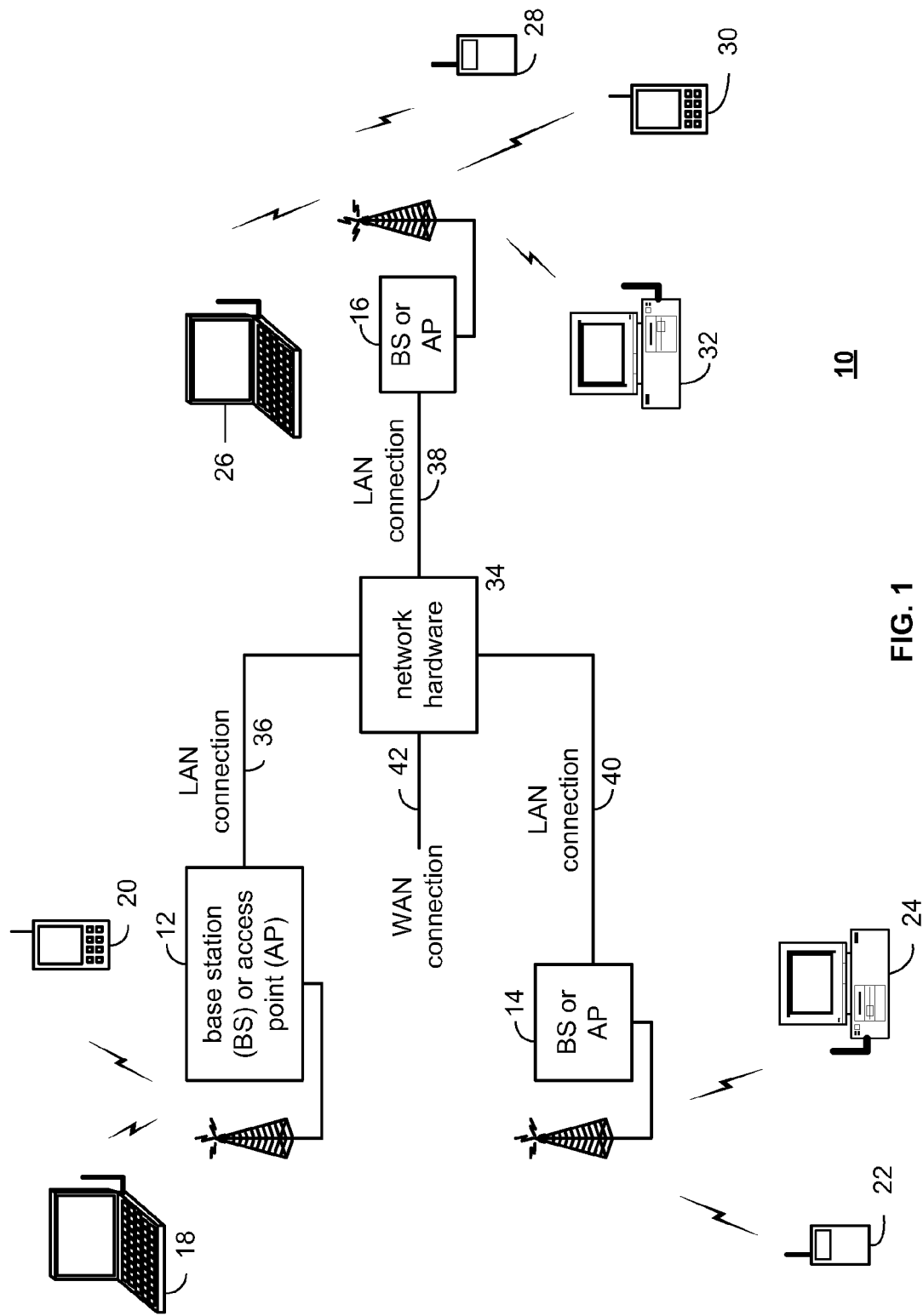
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
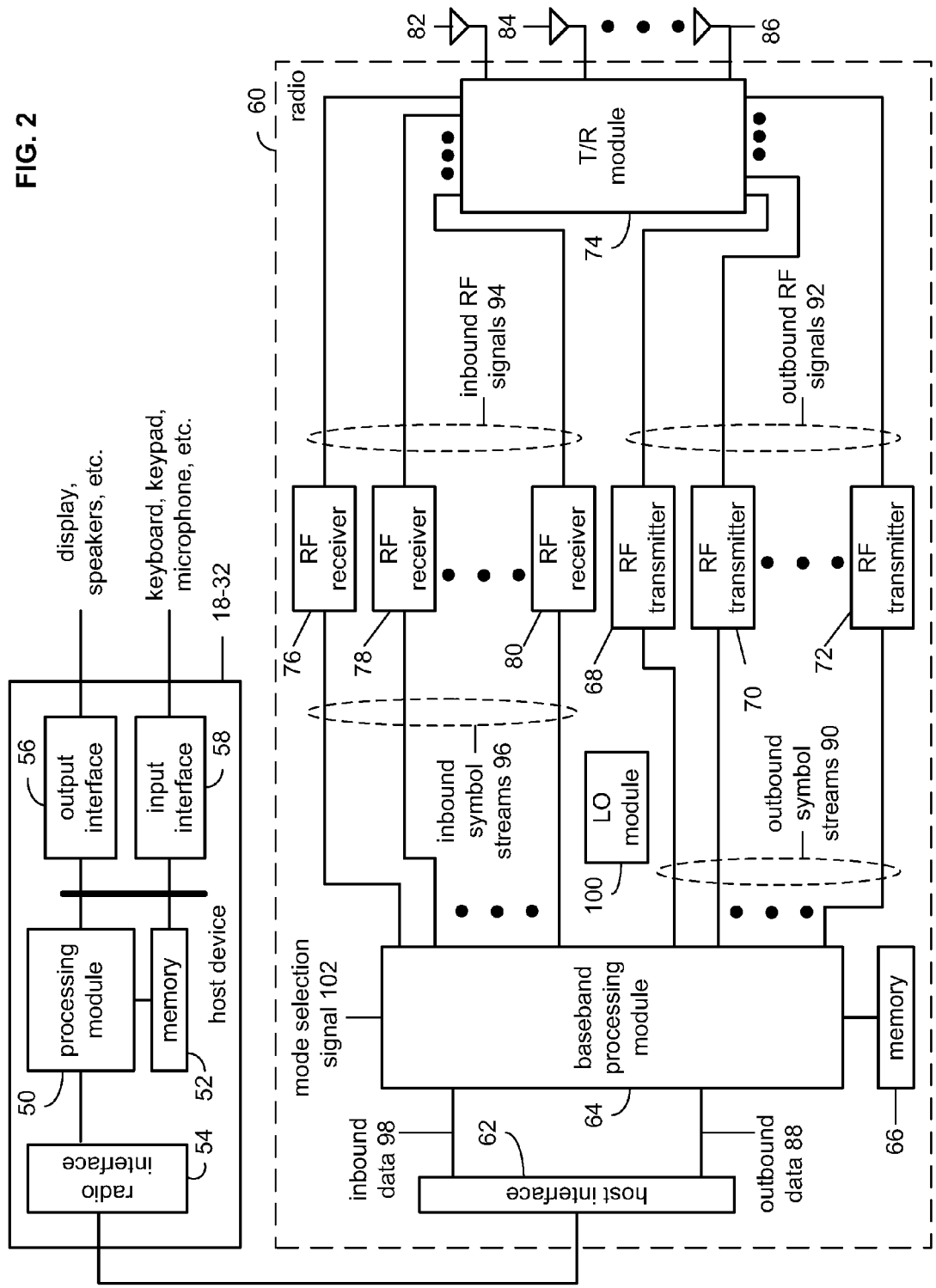
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
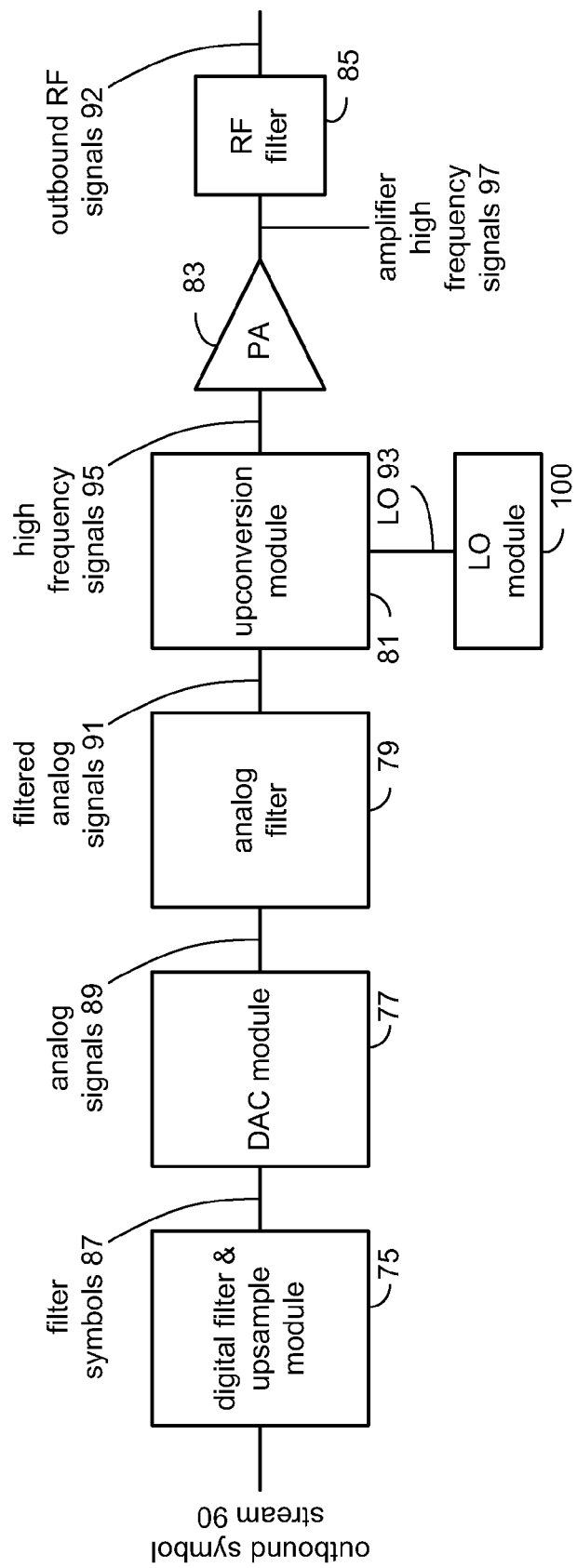
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
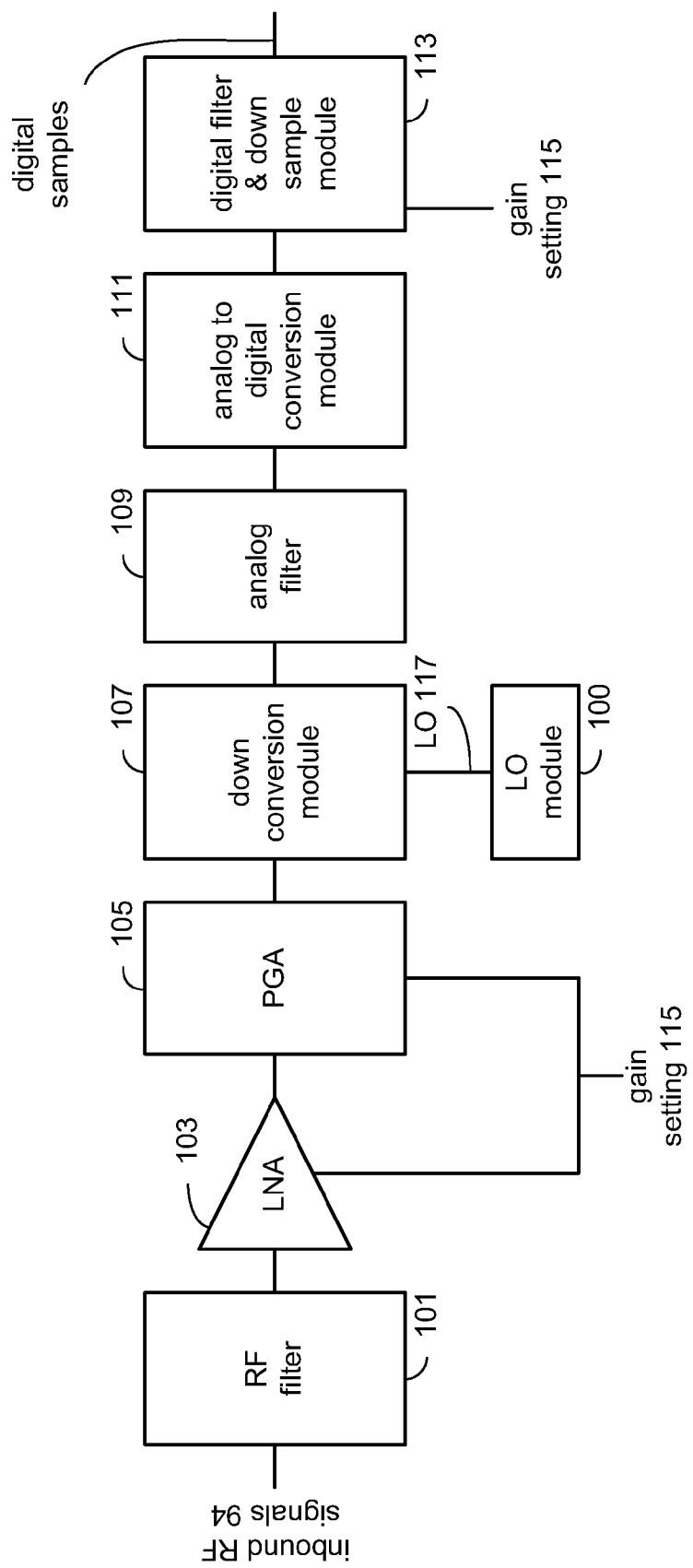
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
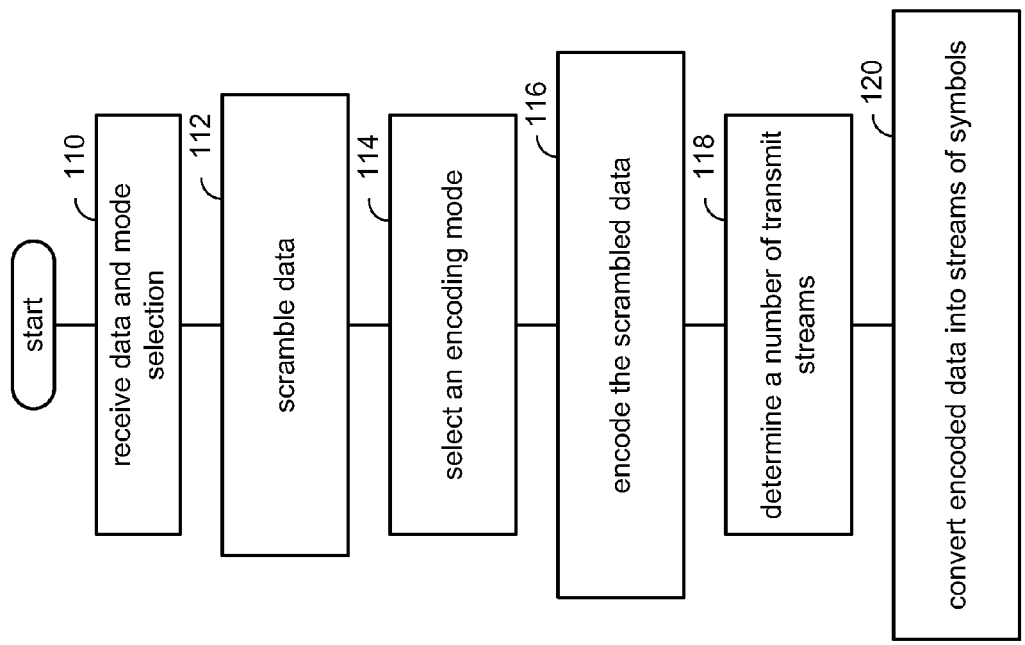
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
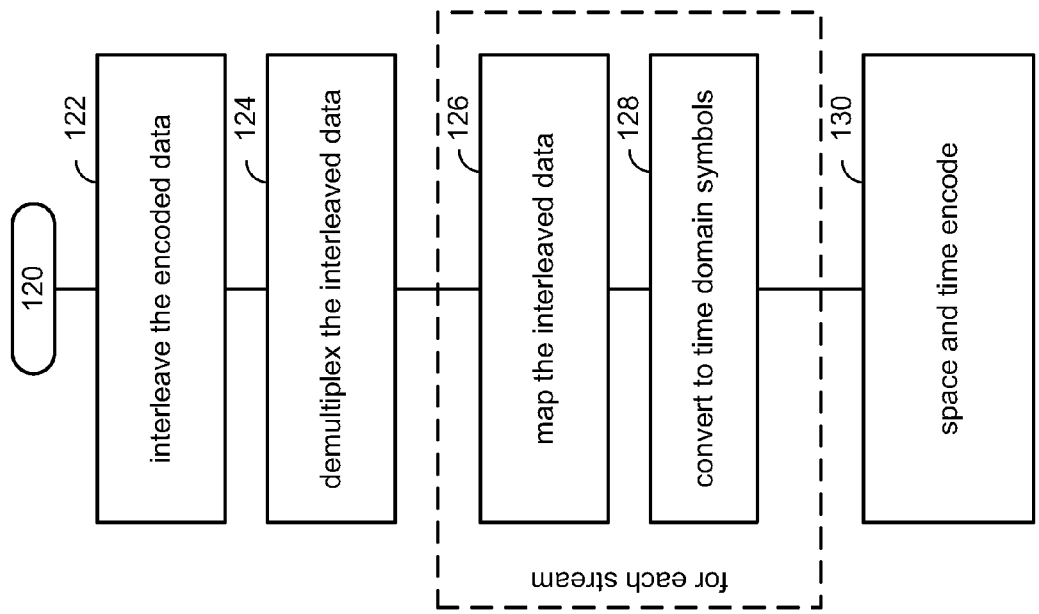
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
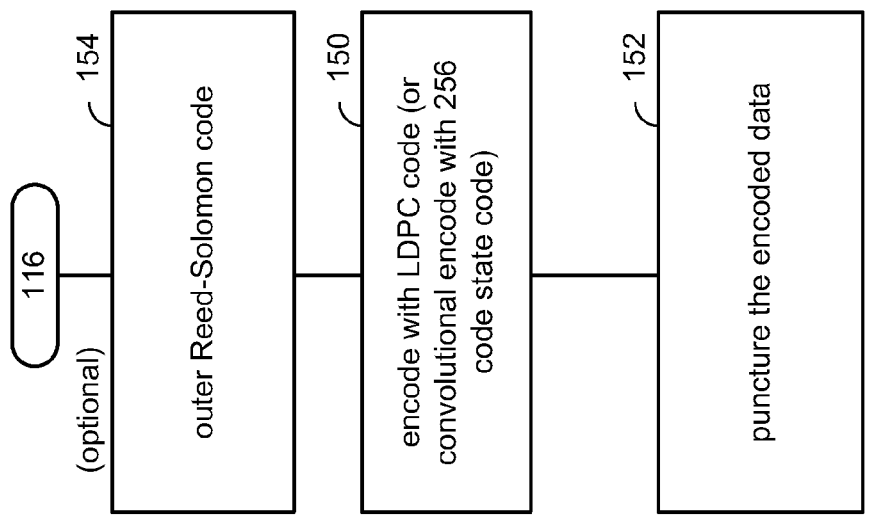
FIGS. 7-9 are diagrams illustrating various embodiments for encoding the scrambled data.
Figure 8:
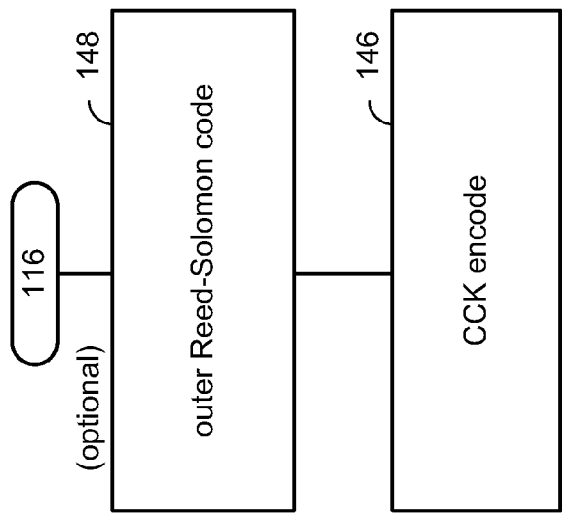
Figure 7:
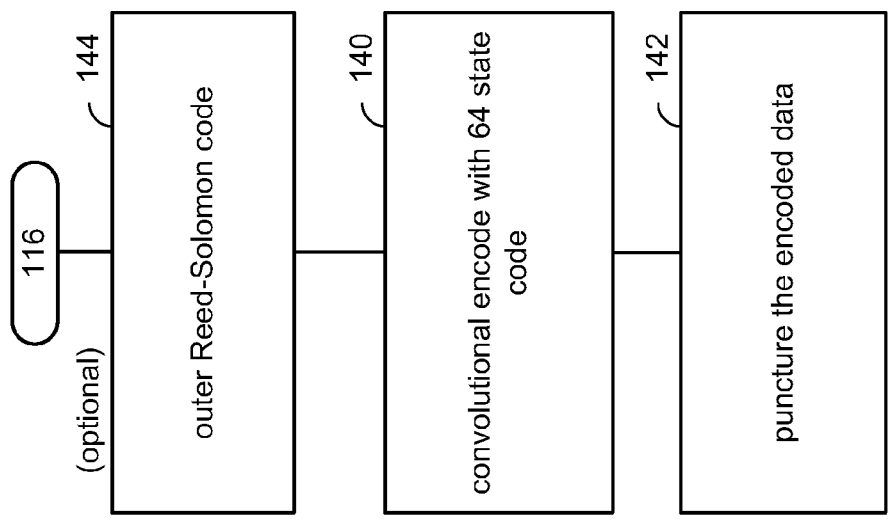

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
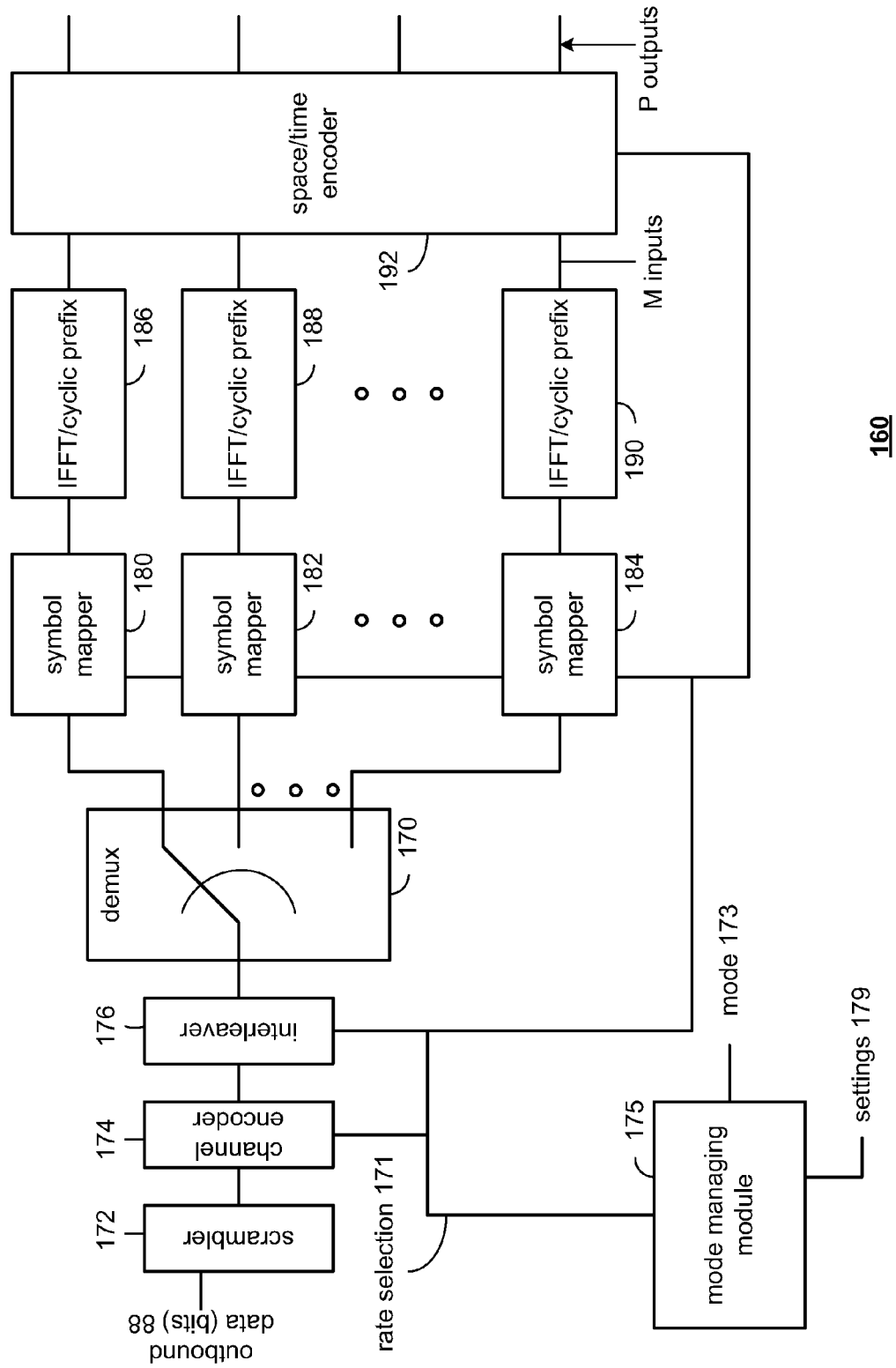
FIGS. 10A and 10B are diagrams illustrating embodiments of a radio transmitter.
Figure 10B:
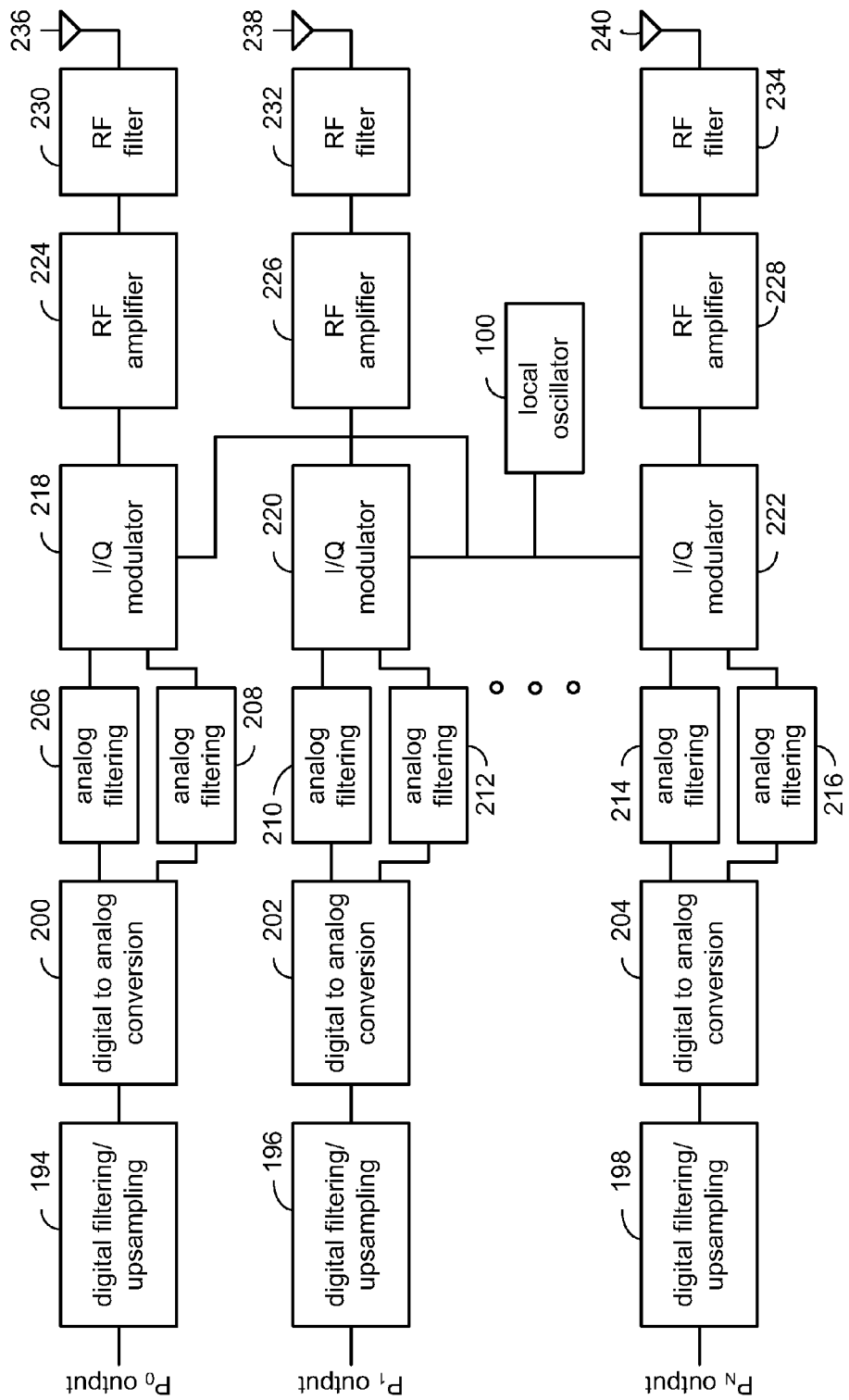

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/ time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, etc.) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \ldots & c_{2M-1} & c_{2M} \\ -c_2^* & c_1^* & -c_4^* & c_3^* & \ldots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
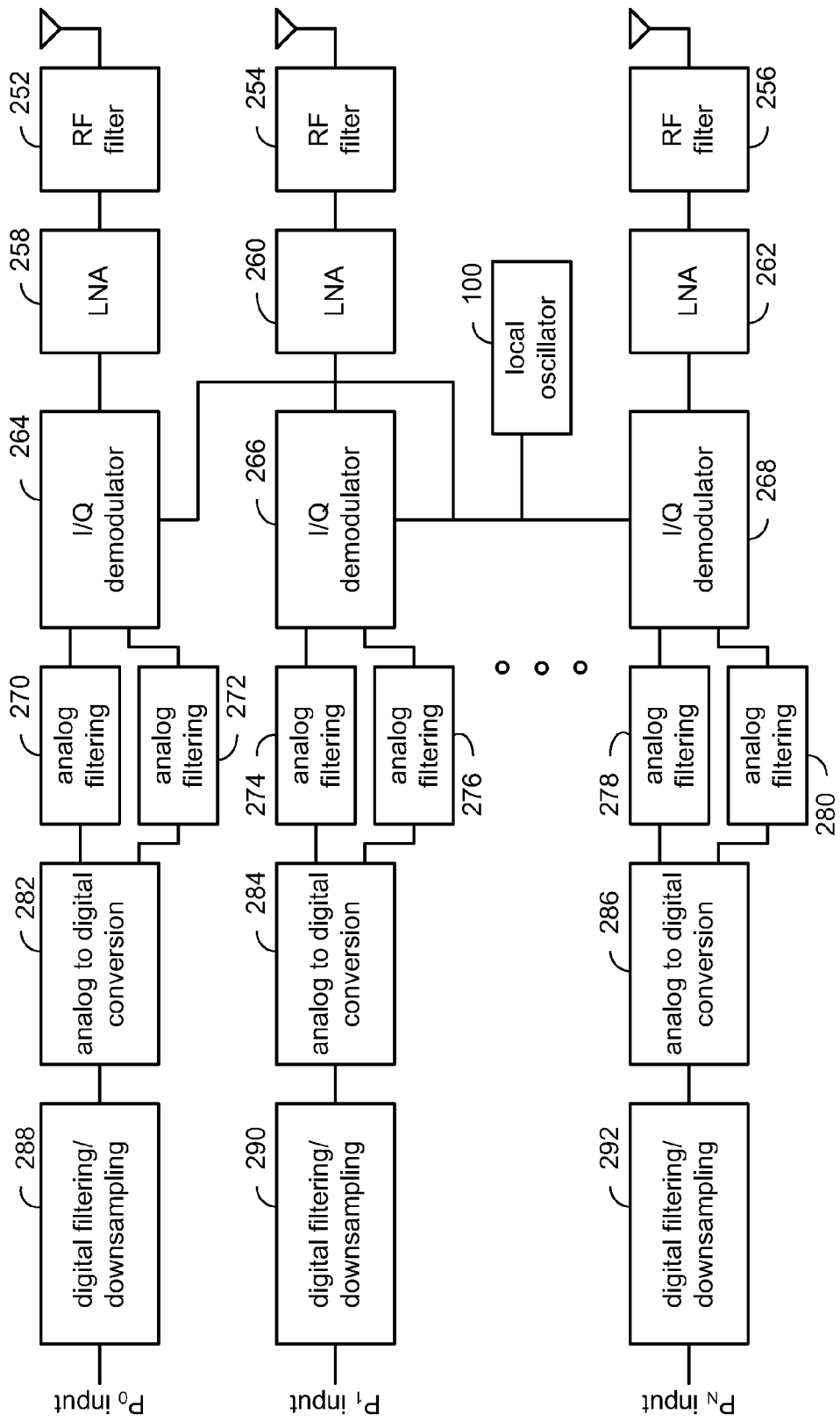
FIGS. 11A and 11B are diagrams illustrating embodiments of a radio receiver.
Figure 11B:
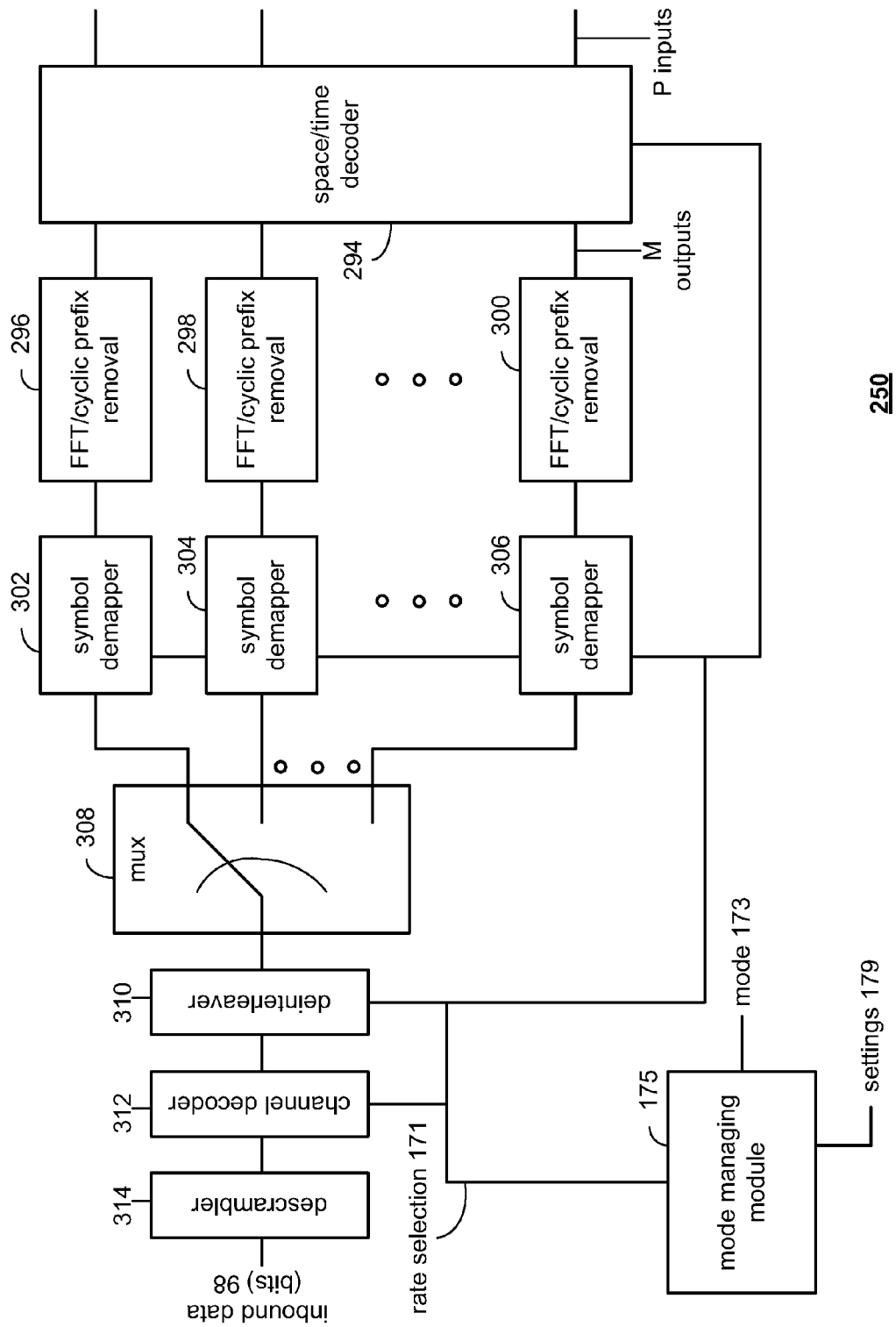

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
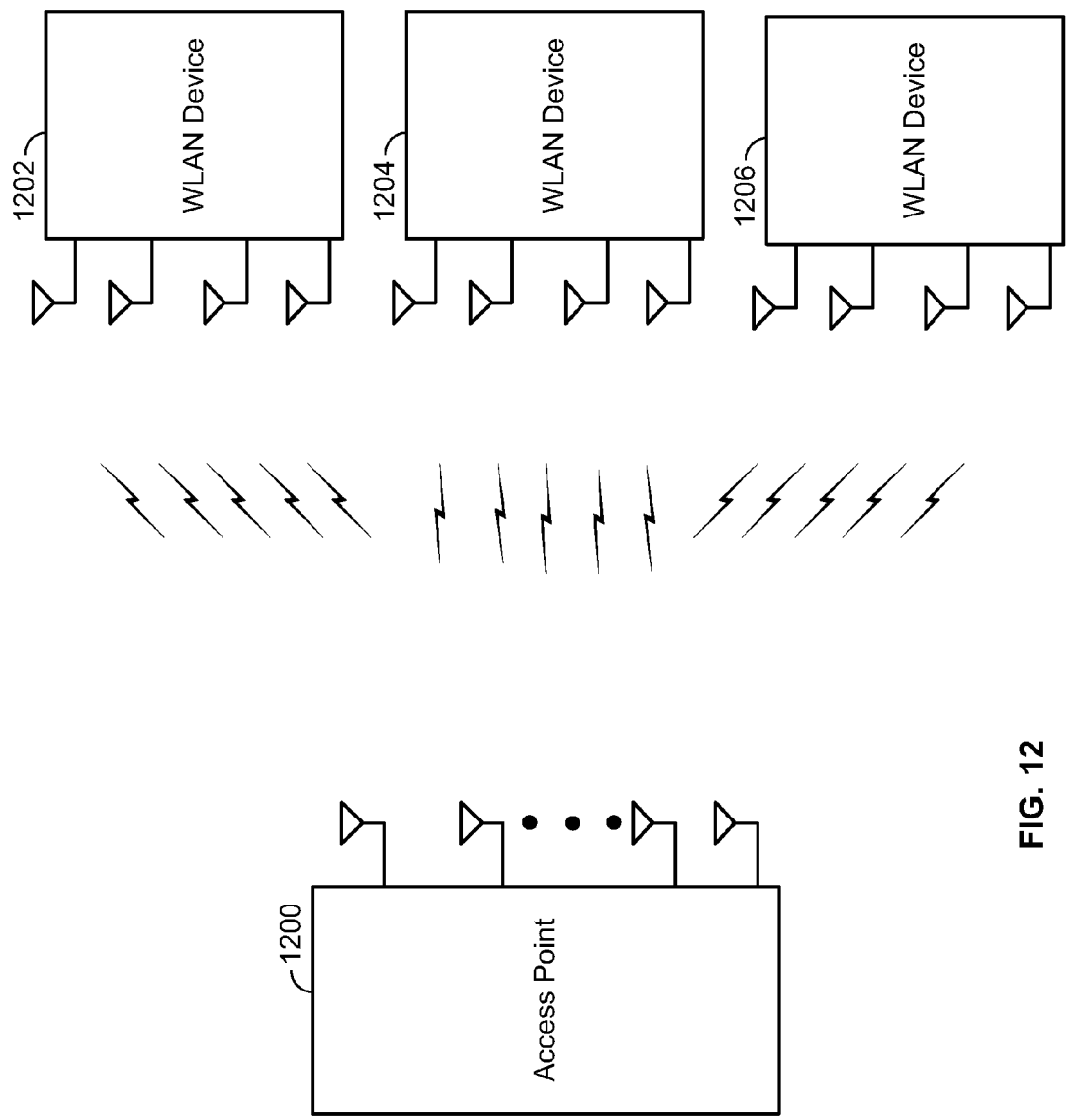
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 13:
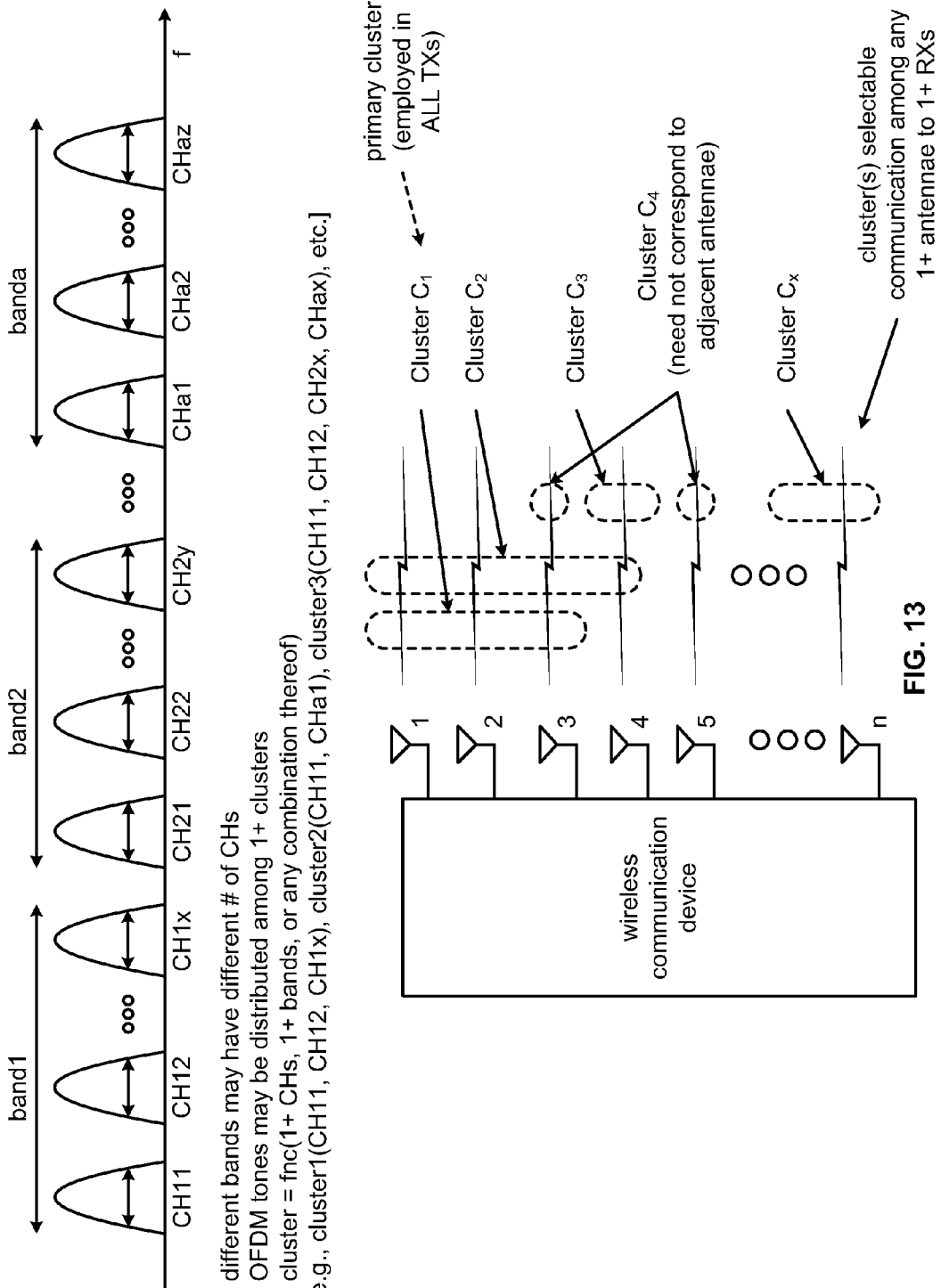
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ah, ad, af, etc.).

With certain wireless communication systems, including those including a number of wireless communication devices, operation therein may sometimes be performed such that one of the communication devices serves as a manager, coordinator, or controller with respect to the other of the communication devices within the system. For example, within a wireless communication system operating in accordance with at least one standard, protocol, and/or recommended practice corresponding to IEEE 802.11x (e.g., where x is a, b, g, n, ac, ah, ad, af, etc.), one of the wireless communication devices may operate as an access point (AP), while other of the wireless communication devices therein may operate as wireless stations (STAs). Of course, certain implementations may include multiple AP's having certain or varying degrees of overlapping service areas, and the STA's may sometimes be free to move from different respective service areas and associated with different respective AP's. In accordance with operation of such systems, certain identifiers may be associated with the different respective wireless communication devices therein. For example, in the context of a wireless communication system operating in accordance with at least one standard, protocol, and/or recommended practice corresponding to IEEE 802.11x (e.g., where x is a, b, g, n, ac, ah, ad, af, etc.), each respective STA therein typically is provided in association identifier (AID) for use during its interaction with the system.

For a wireless local area network (WLAN), such as a wireless communication system operating in accordance with at least one standard, protocol, and/or recommended practice corresponding to IEEE 802.11x (e.g., where x is a, b, g, n, ac, ah, ad, af, etc.), such an AID is a unique identifier that an AP assigns to a non-AP station (i.e., a STA) during association and re-association processes. In accordance with typical operation of such systems, the AID value of a station remains static during the lifetime of that respective devices association with the network, and such and AID value of a given device may be updated/reassigned only after that particular device has disassociated with the network (e.g., disassociated with the AP) and has subsequently been re-associated with the network (e.g., re-associated with the same AP from which the device previously disassociated). However, during operation and the association of a given device with the AP, that device will have a common and static AID value (i.e., each respective device will maintain a unique and specific AID value during its association with the AP).

With respect to the descriptions provided here as well as elsewhere herein, it is noted that while the use of an AID in the context of a wireless communication system operating in accordance with at least one standard, protocol, and/or recommended practice corresponding to IEEE 802.11x (e.g., where x is a, b, g, n, ac, ah, ad, af, etc.) is oftentimes employed for illustration to the reader, it is noted that any generically assigned unique identifier provided to different respective communication devices within a system to assist with them to effectuate the distinction and discrimination among those respective wireless communication devices by a given manager, coordinator, or controller within the communication system may employ and utilize various aspects, and their equivalents, of the invention.

Figure 14:
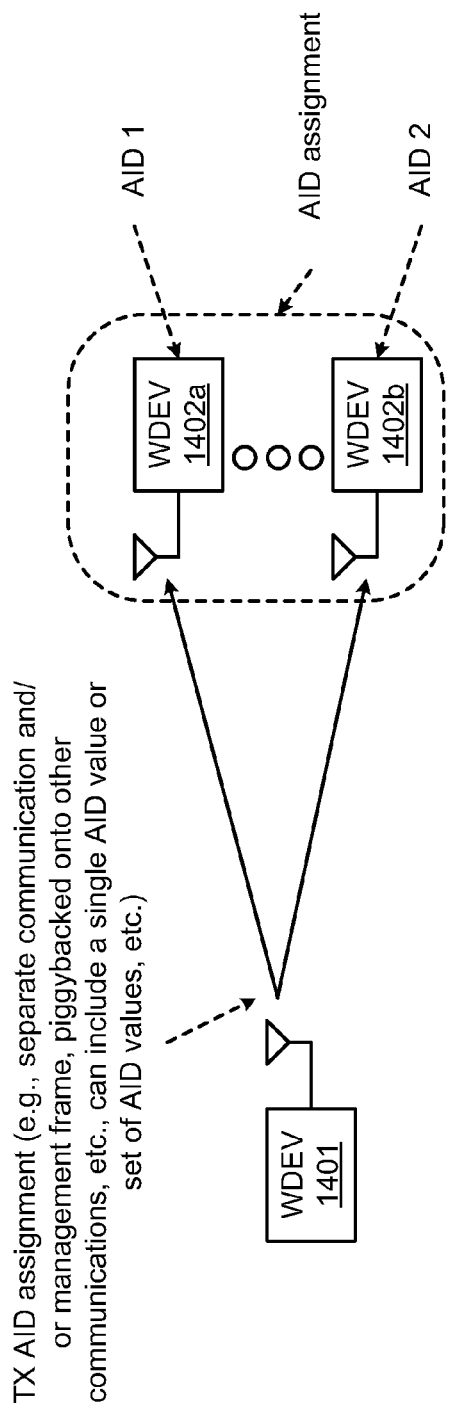
FIG. 14 is a diagram illustrating an embodiment of a wireless communication system including multiple wireless communication devices.

FIG. 14 is a diagram illustrating an embodiment 1400 of a wireless communication system including multiple wireless communication devices. Generally speaking, the wireless communication system of this diagram includes a number of different respective wireless communication devices, depicted as wireless communication device (or generally, device, which are depicted as WDEVs in the diagram) 1401, 1402a through 1402b. With respect to the devices 1402a through 1402b, it is noted that as few as two or generally any desired number of devices may be included therein (e.g., including up to several thousand devices or even more). One of these devices may be implemented to operate as an access point (AP), or as a manager, coordinator, or controller within the communication system. Other of the respective devices may be implemented to operate as non-AP devices, or wireless stations (e.g., STAs).

Generally speaking, the AP operating device, device 1401, may be implemented to transmit an AID assignment to the respective other devices 1402a through 1402b to provide distinct and respective AID's to each of them. For example, in accordance with a given AID assignment, the device 1402a may be provided with AID 1, and the device 1402b may be provided with AID 2. Of course, it is noted that if a given embodiment includes more than two respective non-AP devices, or wireless stations (e.g., STAs), then each of those respective devices will correspondingly be provided with a unique AID in accordance with the AID assignment.

With respect to such assignment of AID's provided from one of the devices within the system to the other of the devices within the system, it is noted that such AID assignment may be provided in any of a number of different ways. For example, in one embodiment, a separate communication and/or management frame may be provided from the AID assigning device to the other of the devices within the system. In other embodiments, such an AID assignment may be provided in the piggyback on other respective communications. A given AID assignment may include a single AID value or a set of AID values. That is to say, as will be seen with respect to other embodiments herein, there may be instances in which an AID assignment is effectuated by an AID assigning device may include as few as a single AID to be provided to the signal respective devices in the system. Of course, in other situations and/or embodiments, more than one AID is provided to more than one respective device in the system.

Figure 15:
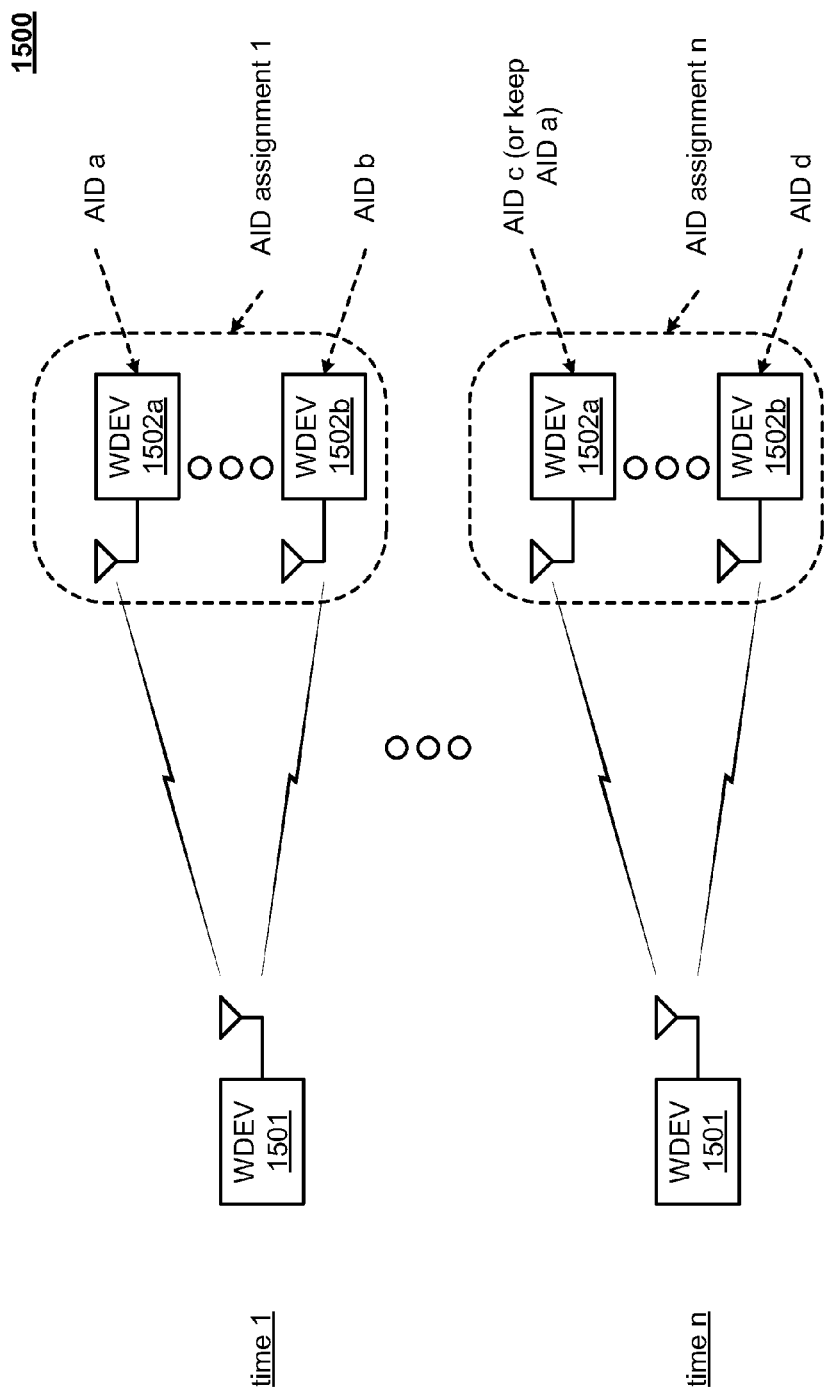
FIG. 15 is a diagram illustrating an alternative embodiment of a wireless communication system including multiple wireless communication devices.

FIG. 15 is a diagram illustrating an alternative embodiment 1500 of a wireless communication system including multiple wireless communication devices. As may be understood with respect to this diagram, association ID's (AID's), which may be assigned to one or more wireless communication devices within a system, may be updated and/or modified, and detail regarding various embodiments by which this may be effectuated is provided below.

Generally speaking, the wireless communication system of this diagram includes a number of different respective wireless communication devices, depicted as wireless communication device (or generally, device, which are depicted as WDEVs in the diagram) 1501, 1502a through 1502b. With respect to the devices 1502a through 1502b, it is noted that as few as two or generally any desired number of devices may be included therein (e.g., including up to several thousand devices or even more). One of these devices may be implemented to operate as an access point (AP), or as a manager, coordinator, or controller within the communication system. Other of the respective devices may be implemented to operate as non-AP devices, or wireless stations (e.g., STAs).

As may be seen with respect to this diagram, over time, different respective AID assignments may be provided to one or more of the other devices within a given communication system. For example, during a first time or time period, an AID assignment 1 may be provided such that device 1502b has an AID a, and device 1502b has an AID b. As may be understood, different respective AID assignments may be provided to update and/or change the AID having one or more of the respective devices dynamically. For example, looking near the bottom portion of the diagram, a subsequent AID assignment, such as indicated by AID assignment n, may provide four different respective AID's to one or more of the devices 1502a through 1502b. As may also be understood with respect other embodiments under diagrams herein, there may be some instances in which not all of the respective devices undergo an update and/or change of AID. For example, there may be some situations in which the AID of only one or more (but less than all) of the non-AP devices within the system undergo a change and/or update. For example, there may be some instances in which the AP does not desire to update the corresponding AID's for all of the non-AP devices within the system. There may also be other situations in which one of the non-AP devices denies or disallows its respective AID from being changed/updated.

The initiation of which of the respective devices within the overall system request such an AID update may be varied in different situations and/or embodiments.

For example, in certain embodiments, only the AP operating device is provided authority to initiate an update of an AID for any one or more of the other, non-AP devices within the system. In other embodiments, and respective devices in the system may initiate an AID update, including any one of the non-AP devices within the system. In even other embodiments, the AP operating device and one or more of the non-AP devices operate cooperatively in accordance with coordinating an update of an AID associated with any one of the respective devices within the system. Also, a given AID value may be updated more than once (e.g., 2, 3, or generally N times) while a given communication device (e.g., STA) remains continuously associated with a network coordinator or manager communication device (e.g., AP).

Figure 16:
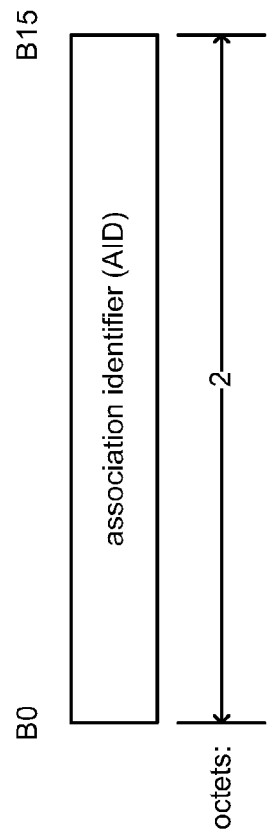
FIG. 16 is a diagram illustrating an embodiment of an association identifier (AID) field.

FIG. 16 is a diagram illustrating an embodiment 1600 of an association identifier (AID) field. Utilizing terminology associated with at least one standard, protocol, and/or recommended practice corresponding to IEEE 802.11x (e.g., where x is a, b, g, n, ac, ah, ad, af, etc.) for illustration, and AID field (2-octet in length) is included in the association response and the re-association response frame. For example, the 14 least significant bits (LSBs) may be employed to represent unique AID's. The 2 most significant bits (MSBs) may always be set to a value of 1.

Generally speaking, AID's may be used in a number of different respective ways. For example, the AID's may be used for constructing the traffic indication map (TIM) information element (IE) to indicate to the respective non-AP devices within the system whether or not they respectively have one or more buffered frames located at the AP operating device. For example, a traffic indication map (TIM) information element (IE) (or alternatively, TIM IE) may be included within beacon frames and/or TIM broadcast frames transmitted by an AP operating device. For example, at least one implementation of a beacon frame is specified in accordance with IEEE Std 802.11™-2007 referenced and incorporated by reference herein above, and at least one implementation of a TIM broadcast frame is specified in accordance with IEEE Std 802.11v™-2011, as referenced and incorporated by reference herein above. Generally speaking, the longer the size of the TIM IE, the longer a given respective non-AP device operating in accordance with a power save (PS) mode needs to stay awake and operative.

For example, a power save poll (PS-Poll) frame, which are used by non-AP devices operating in accordance with PS mode (and particularly when in the awake state) to retrieve their respective buffered frames at the AP operating device, also includes the respective AID.

In order to indicate whether or not any buffered frames are existent within the AP operating device within the system, and particularly intended for one of the other devices within the system (e.g., one of the STAs), the AP operating device maintains a traffic indication virtual bitmap (TIVB) that consists of a number of bits that are organized into a number of octets (e.g., the TIVB uses or is based on a number of AID values). For example, in one embodiment in accordance with at least one standard, protocol, and/or recommended practice corresponding to IEEE 802.11x (e.g., where x is a, b, g, n, ac, ah, ad, af, etc.), the TIVB consists of 2008 bits that are organized in the 251 respective octets. The AP operating device assigns respective association identifiers (AIDs) to each of the non-AP devices (e.g., the STAs). Also, it is noted that the respective AID corresponding to the bit indices ranging from 0 to M−1 of the TIVB are not used in the AID assignment. For example, M is the maximum possible number of basic service sets (BSSs) that may be supported by the AP operating device. M may generally be any number they can be expressed as $M=2^n$, such as in accordance with that which is specified in IEEE Std 802.11v™-2011, as referenced and incorporated by reference herein above. M0, where M0<M, is the actual number of BSSs that may be supported by the AP operating device using a single (e.g., M0=1) basic service set identifier (BSSID) or multiple (e.g., $1<M0 \le M$) basic service set identifiers (BSSIDs).

The different respective AID's corresponding to the bit indices M to 2007 of the TIVB are in fact used in in the AID assignment. That is to say, certain values associated with certain bit indices of the TIVB are not used in the AID assignment while others are in fact used in the AID assignment.

Figure 17:
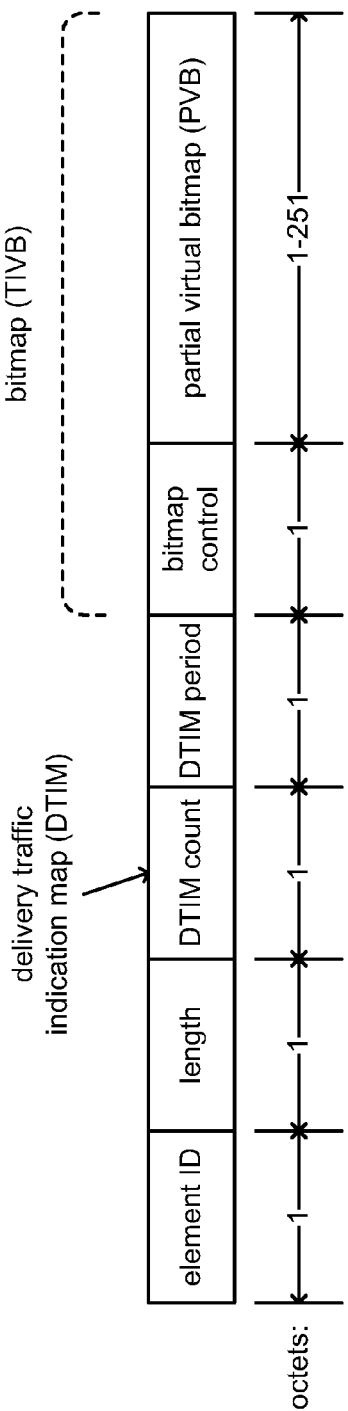
FIG. 17 is a diagram illustrating an embodiment of a traffic indication map (TIM) information element (IE) field.

FIG. 17 is a diagram illustrating an embodiment 1700 of a traffic indication map (TIM) information element (IE) field. With respect to this diagram, it can be seen that the TIM IE includes a number of respective fields. For example, considering from left to right in the diagram, such a TIM IE may be implemented to include an element identifier (ID) field, a length field, a delivery traffic indication map (DTIM) count field, a DTIM period field, a bitmap control field, and a partial virtual bitmap (PVB) field.

The AP operating device is implemented to maintain a traffic indication virtual bitmap (TIVB) (e.g., the TIVB uses or is based on a number of AID values), which is used by the AP operating device to generate the PVB field and the bitmap control field of the TIM IE. The AP operating device may be implemented to use bits associated with the indices ranging from 0 to M0−1 of the TIVB to indicate the buffered broadcast and/or multicast frames for all of the supported basic services sets (BSSs). With respect to the TIVB, it is noted on the respective component thereof need not necessarily be transmitted from the AP operating device to the non-AP devices within the system. For example, the last two remaining components of the TIM IE, namely, the bitmap control field and the partial virtual bitmap (PVB) field, are those respective fields that are sent from the AP operating device to the non-AP devices within the system, and used by the non-AP devices to determine whether they have frames buffered at the AP operating device.

In situations in which there may be no respective broadcast and/or multicast frames buffered for a given BSS when the DTIM count field has a value of 0, the respective and corresponding bits associated with such a BSS index or indices are set to 0. However, in situations in which the AP operating device does in fact have at least one respective broadcast and/or multicast frames buffered for a given BSS when the DTIM count field has a value of 0, the respective and corresponding bits associated with such a BSS index or indices are set to 1.

With respect to an implementation in which the different respective AID's correspond to the bit indices M to 2007 of the TIVB, the AP operating device may be implemented to use the bits corresponding to bit indices M to 2007 of the TIVB to indicate the buffered unicast frames for those corresponding non-AP devices. If there are no unicast frames buffered for a given non-AP device (e.g., a STA) whose AID is N, then the bit N is set to 0. However, if there are in fact one or more unicast frames buffered for a given non-AP device (e.g., a STA) whose AID is N, then the bit N is set to 1.

The bits corresponding to the bit indices M0 to M−1 of the TIVB are reserved and set to a value of 0. The AP operating device uses the bitmap offset value in the bitmap control field to convey any appropriate offset information related to the PVB field. For example, such information may be needed by the respective non-AP devices within the system for correct interpretation of the PVB. Various implementations with respect to PVB construction are specified in IEEE Std 802.11™-2007 (e.g., with respect to a single BSS, i.e., M=1) and IEEE Std 802.11v™-2011 (e.g., with respect to a single BSS, i.e., M>1) and, both of which are referenced and incorporated by reference herein above.

Figure 18:
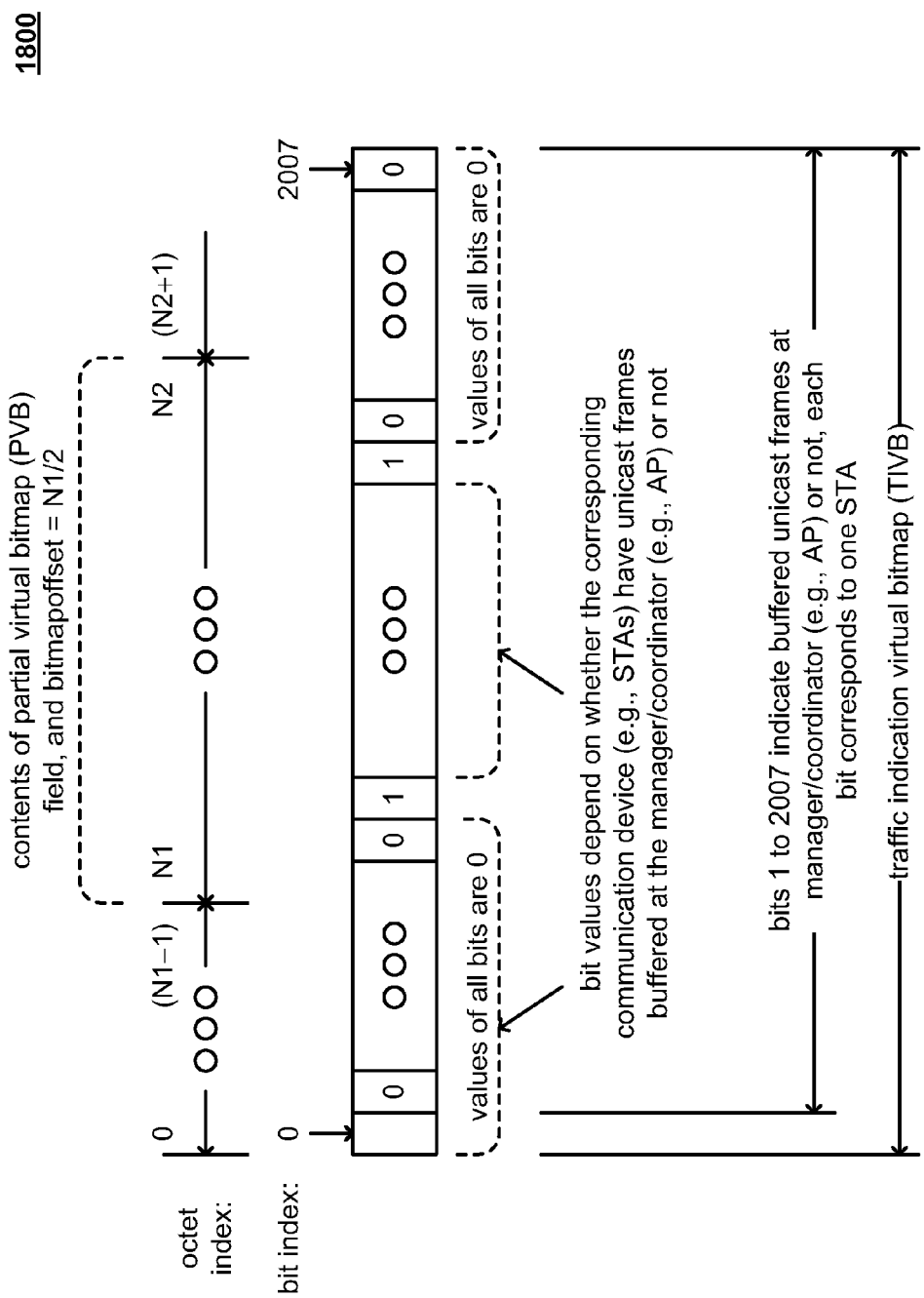
FIG. 18 is a diagram illustrating an embodiment of a partial virtual bitmap (PVB) field content for a single-basic services set identifier (single-BSSID).

FIG. 18 is a diagram illustrating an embodiment 1800 of a partial virtual bitmap (PVB) field content for a single-basic services set identifier (single-BSSID).

The PVB field consists of octets number N1 through N2 of the TIVB. N1 corresponds to the largest even number such that bits numbered 1 through (N1×8)−1 in the bitmap are all equal to 0. N2 is the smallest number such that the bits numbered (N1+1)×8 through 2007 in the bitmap are all equal to 0. The bitmap offset field value contains the number N1/2. The length field is set to (N2−N1)+4.

Figure 19:
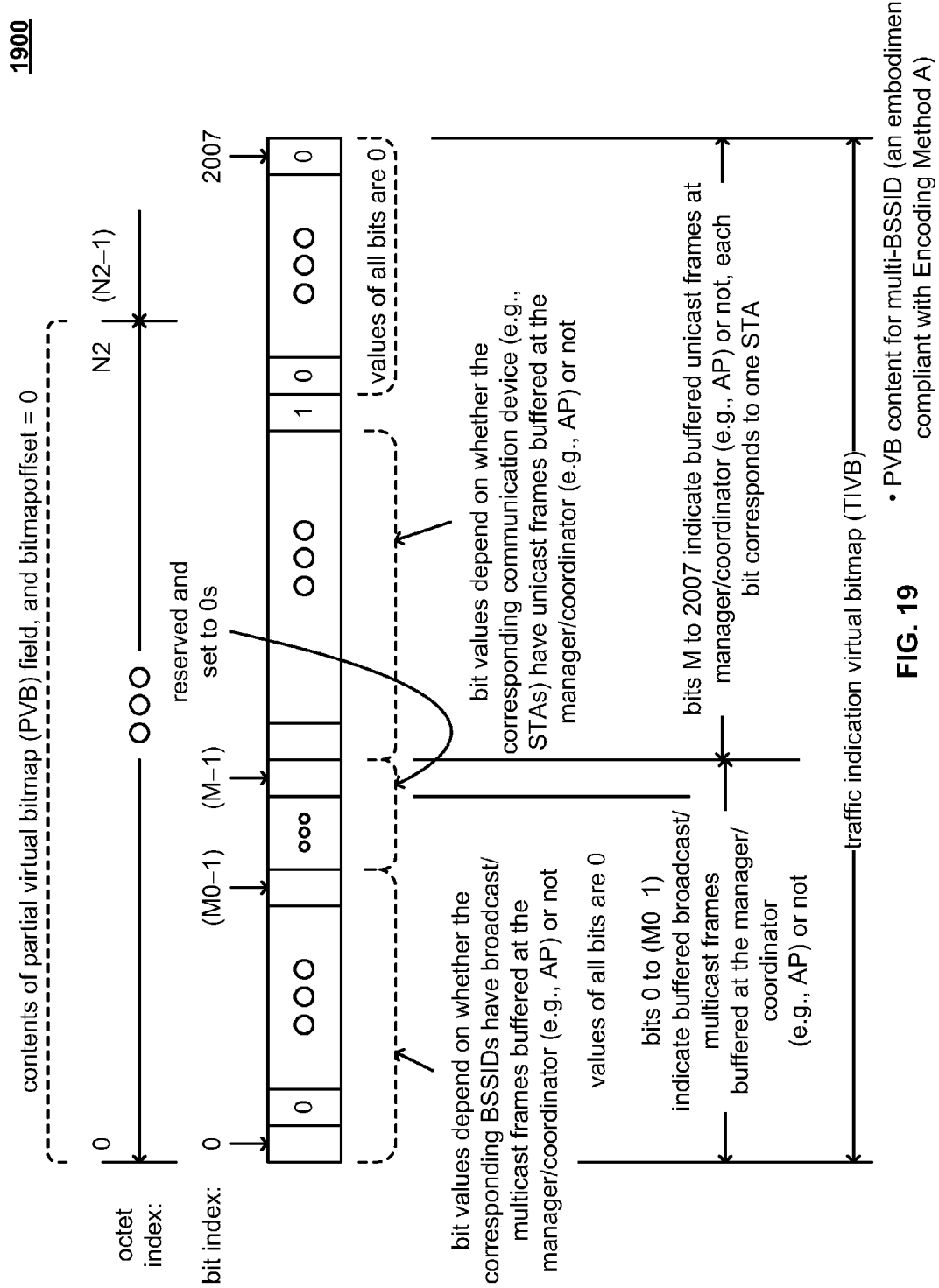
FIG. 19 is a diagram illustrating an embodiment of a partial virtual bitmap (PVB) field content for multiple-basic services set identifier (multi-BSSID) (an embodiment compliant with Encoding Method A per IEEE Std 802.11v™-2011).

FIG. 19 is a diagram illustrating an embodiment 1900 of a partial virtual bitmap (PVB) field content for multiple-basic services set identifier (multi-BSSID) (an embodiment compliant with Encoding Method A per IEEE Std 802.11v™-2011).

Figure 20:
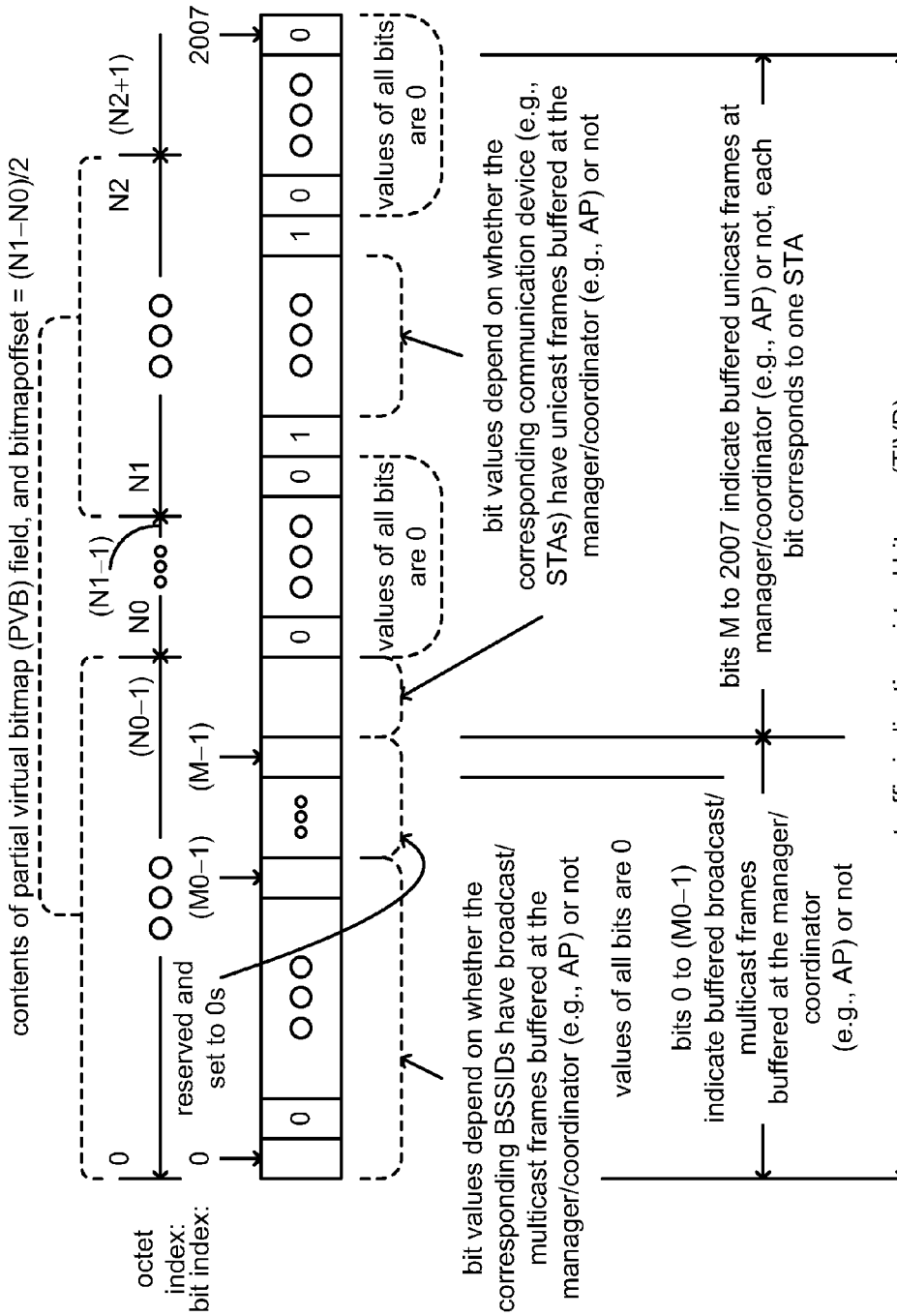
FIG. 20 is a diagram illustrating an alternative embodiment of a partial virtual bitmap (PVB) field content for multiple-basic services set identifier (multi-BSSID) (an embodiment compliant with Encoding Method B per IEEE Std 802.11v™-2011).

Based upon its corresponding knowledge of the capability of associated non-AP devices within the system as well as the content of the TIVB, and AP operating device may be implemented to encode the PVB and bitmap control field of the TIM IE using either the embodiment compliant with Method A associated with FIG. 19 or the embodiment compliant with Method B associated with FIG. 20. Such embodiments are also described in accordance with IEEE Std 802.11v™-2011, which is referenced and incorporated by reference herein above. It is noted that such an AP operating device may be implemented to employ the embodiment compliant with Method B whenever it does not incur any such misrepresentation of the received PVB, and the AP operating device may be implemented to employ the embodiment compliant with Method A otherwise.

In accordance with the operation associated with the embodiment compliant with Method A, the PVB field consists of octets numbered zero through N2 of the TIVB. N2 is the smallest number such that bits numbered (N2+1)×8 through 2007 in the bitmap are all equal to 0. The bitmap offset is set to 0, and the length field is set to N2+4.

FIG. 20 is a diagram illustrating an alternative embodiment 2000 of a partial virtual bitmap (PVB) field content for multiple-basic services set identifier (multi-BSSID) (an embodiment compliant with Encoding Method B per IEEE Std 802.11v™-2011).

In accordance with operation associated with embodiment compliant with Method B, the PVB field consists of a concatenation of octets numbered zero through N0−1 and octets numbered N1 through N2 of TIVB. N0 is the smallest positive integer number such that N0×8−M≤8. If the value of N0 is an odd number, then N1 is the largest odd number such that N0<N1 and each of the bits N0×8 through N1×8−1 is equal to 0. When N0 is an even number, N1 is the largest even number such that N0<N1 and each of the bits N0×8 through N1×8−1 is equal to 0. If such a value N1>N0 does not exist, then N1 is set to be the same value as N0 (i.e., N1=N0).

N2 is the smallest integer value for which the values for bits numbered (N2+1)×8 through 2007 in the bitmap are all equal to 0. If such a value N2 does not exist (e.g., when not all of the bits in the last octet of the TIVB or equal to 0), then N2=250.

Using such Method B, the bitmap field is set to (N1−N0)/2, and the length field is set to N0+N2−N1−4.

Figure 21:
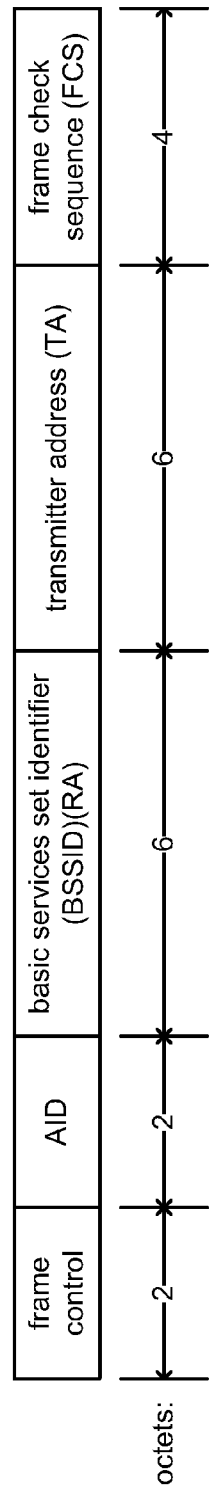
FIG. 21 is a diagram illustrating an embodiment of a power save (PS)-poll frame format.

FIG. 21 is a diagram illustrating an embodiment 2100 of a power save (PS)-poll frame format.

Generally speaking, PS-poll frames are used by a PS operating non-AP (e.g., a STA operating in accordance with a PS mode) in an awake state to poll the AP operating device to retrieve its respective frames buffered at the AP operating device. Such an AID is included in a PS-poll frame as the unique identifier for a given non-AP device sending the retrieve request. For example, such an AID included therein indicates to the AP operating device which respective non-AP device has sent a given request to retrieve its respective frames buffered at the AP operating device.

As mentioned above with respect to various embodiments herein, it is noted that certain embodiments and/or illustrations have been provided with respect to operation in accordance with the wireless local area network (WLAN) context, such as that which is operative in accordance with at least one standard, protocol, and/or recommended practice corresponding to IEEE 802.11x (e.g., where x is a, b, g, n, ac, ah, ad, af, etc.). However, again, generally speaking, any communication system in which identification of multiple respective communication devices therein is made may employ and utilize various aspects, and their equivalents, of the invention. For example, while the terminology associated with AID is utilized within the wireless local area network context, the reader will of course understand that such functionality and/ or operations as described herein may generally be extended to any communication system application in which identification of different respective communication devices therein is made.

For example, with respect to ongoing development of any standard, protocol, and/or recommended practice corresponding to IEEE 802.11x (e.g., where x is a, b, g, n, ac, ah, ad, af, etc.), such a TIM structure as described herein may be modified to be more suitable for such one or more scenarios. However, the assignment of an ID value for each respective non-AP device (e.g., STA) within the system and the use of the TIM IE to indicate respective buffered frames within an AP operating device may nonetheless remain as currently implemented and performed. In addition to the TIM IE and/or any other frames containing the TIM IE, PS-poll frames, etc., the corresponding AID value of a given non-AP device (e.g., STA) may be included in any other information element, frame, communication, etc. for any other of a number of various purposes.

As may be understood with respect to the use of AID values for different respective communication devices within the system, the updating/changing of any one or more AID values associated with such communication devices while a STA in association may not be performed in accordance with currently implemented standards, protocols, and/or recommended practices corresponding to IEEE 802.11x. As illustrated with respect to various diagrams and/or embodiments included herein and described above, a novel approach is presented by which the respective AID values of one or more respective devices within a communication system may be dynamically updated/changed for a given one or more of those respective devices as they maintain association with an AP operating device and/or the network. For example, it is noted that appropriately and/or optimally selected AID values for the non-AP devices (e.g., STAs) within the system can provide for a reduction in the length of a PVB. Consequently, with a reduction in the length of a PVB, the length of the TIM IE can be correspondingly small as well, and thus improve the power save performance of the non-AP devices.

For example, it may be more optimal to have all of the respective non-AP devices (e.g., STAs) within a communication network to have respective AID values relatively close to one another in certain situations. As such, a novel approach is presented herein by which the respective AID value for one or more non-AP devices (e.g., STAs) within a communication network may be dynamically updated without undergoing a disassociation and re-association process. That is to say, while a given non-AP device (e.g., STA) maintains association with an AP operating device or network, and AID value for that non-AP device (e.g., STA) may be dynamically updated/changed over time. As may be understood, there may be embodiments in which a given communication network, there may be instances in which different respective non-AP devices (e.g., STAs) have AID values that cause the length of PVB, and also consequently the length of the TIM IE, to be undesirably and correspondingly quite long or large. By providing the ability to update such AID values, the length of a PVB, and consequently the length of the TIM IE, can be kept correspondingly small, and therefore to improve the power save performance of non-AP devices.

Moreover, it is noted that optimal selection of AID values for the respective non-AP devices (e.g., STAs) may also be made initially as the communication network begins operation, and subsequent optimal selection of AID values may be made for those devices during ongoing operation of the communication network in efforts to maintain a more optimal or most optimal selection of AID values for the respective devices within the network. By providing for subsequent and ongoing updating/changing of the AID values over time, continually optimal AID value assignment may be effectuated for operation of the network, despite the dynamic membership of a basic services set (BSS) (e.g., such as may be the result of new associations of any one or more non-AP devices (e.g., STAs) joining the BSS and/or disassociation of any one or more non-AP devices (e.g., STAs) departing the BSS).

The novel approach by which AID value assignment may be dynamically modified over time allows for ongoing and continued optimization of the respective AID values which can provide for a means by which the length of a PVB, and consequently the length of the TIM IE, can be kept correspondingly small. As may be understood with respect to a relatively shorter PVB, and consequently the length of the TIM IE, any non-AP device (e.g., STA) operating in accordance with a power save operational mode will be able to reduce the duration which that device needs to stay awake (e.g., such as for processing any received communication).

As may be understood with respect to the various embodiments and/or diagrams included herein, it may be seen that authorization and permissibility is provided to an AP operating device within a communication system to change the AID value of any one or more associated non-AP devices (e.g., STAs) while those one or more non-AP devices (e.g., STAs) is/are associated to the AP operating device. For example, during both the initial AID value assignment and the subsequent update for a non-AP device (e.g., STA), the AP operating device chooses a value that results in a short length of PVB and/or potentially some other desired properties.

In accordance with operation of current standards, protocols, and/or recommended practices corresponding to IEEE 802.11x and variants thereof, in order to have an ideal AID value assignment, an AP operating device must disassociate a non-AP device (e.g., STA) with undesirable AID and re-associate it with an assignment of a new or more desirable AID. This approach is undesirable, can be blunt and can disrupt the on-going services (e.g., requires disassociation).

In accordance with various aspects, and their equivalents, of the invention, the AID value for each respective non-AP device (e.g., STA) may be selected appropriately so that the length of the TIM IE can be reduced, regardless of any new TIM IE structure developed in accordance with any new IEEE 802.11 related amendments, changes, variations, etc. (e.g., such as those in accordance with drafts and developing standards associated with IEEE 802.11ah, IEEE 802.11af, etc.). Also, in accordance with various aspects, and their equivalents, of the invention, the AID value for each respective non-AP device (e.g., STA) may be selected appropriately so that the length of the TIM IE can be reduced, regardless of the frequency band in which any such non-AP devices (e.g., STAs, such as WLAN/802.11 devices) operates. The lack of update/change of the AID values for non-AP devices (e.g., STAs) after an initial AID assignment is inherently inflexible and can prevent the realization power saving, among other considerations, that an update/change of the AID values can provide.

The AID value update/change applies, regardless of the frequency band (e.g., 2.4 GHz, 5 GHz, 900 MHz, TV white space) in which the devices operate. The representation format for an AID value, that is, an AID value is represented using the format illustrated in FIG. 16 (as defined in IEEE Std 802.11™-2007, which is referenced and incorporated by reference herein above) and/or possibly using other formats that might be introduced in the emerging 802.11 amendments, variants, proposals, modifications, etc.

Such types of the frames (e.g., PS-poll frame) may contain a single AID value (e.g., corresponding to a singular non-AP device (e.g., STA) or a set of AID values (e.g., corresponding to multiple respective non-AP devices (e.g., STAs)). It is noted that the exact structure of a TIM IE that utilizes AID values, for example, may be implemented in accordance with the TIM IE structure defined in the current standards IEEE Std 802.11™-2007 and IEEE Std 802.11v™-2011, both of which are referenced and incorporated by reference herein above. Generally speaking, regardless of the structure implemented, by providing for the update/changing of AID values associated with different respective devices within a communication system, various aspects, and their equivalents, of the invention may be implemented.

An exemplary mechanism used for AID value updates may be described as follows. An AP operating device sends to a non-AP device (e.g., STA) a unicast "AID update request frame" which contains the new AID for that non-AP device (e.g., STA) and other necessary frame contents. The AP operating device sends the frame when the receiving non-AP device (e.g., STA) is either not in Power Save mode, or in the awake state of the Power Save mode, or at any other time when an AP operating device is allowed to transmit to a non-AP STA device.

Upon receiving the "AID update request frame", the non-AP device (e.g., STA) updates its AID value. The non-AP device (e.g., STA) send a "AID update response frame" confirming the successful update of its AID value. The confirmation can be indicated by the setting of a particular field of the "AID update response frame". Alternatively, upon receiving an Acknowledge (ACK) frame corresponding to the "AID update request frame", then AP operating device considers the AID update as successful (e.g., if the protocol mandates that a non-AP device must always accept the AID update request from the AP).

Another exemplary mechanism is to piggyback the AID update request and the new AID value in a frame that also serves other purposes. Upon receiving such a request, the non-AP device (e.g., STA) update its AID value and send an indication of a successful update to the AP operating device contained in a corresponding response frame. The response frame can be a particular type of frame including the update confirmation (via a field setting, etc.) or possibly an ACK frame (e.g., if the protocol mandates that a non-AP device must always accept the AID update request from the AP). The change/update of the AID values can be done in many ways, that is, through other methods of information exchange between the AP operating device and the non-AP devices (e.g., STAs). When the update request is contained in a group-addressed frame, the AID update can be done for one or more non-AP devices (e.g., STAs) using a single request frame and the corresponding response frames, for better updating efficiency.

A non-AP device (e.g., STA) can also potentially initiate the AID value change/update by sending a change/update request to the AP. If a non-AP device (e.g., STA) refuses to update/change its AID value for any reason, it communicates its refusal to the update requesting device (e.g., AP) through appropriate frame exchanges.

The AID value change/update is still applicable, if the maximum AID value is increased from the current value of 2007 (as in 802.11-2007) to a larger number to accommodate more non-AP devices (e.g., STAs) in a BSS. Also, the AID value change/update is still applicable, if other modifications are made to the TIM information element.

The AID value update/change after an initial assignment applies to other deployment topologies where the AID assignment is not done by an AP operating device but by another device. (e.g., a non-AP device (e.g., STA) in an IBSS). In these scenarios, the device that assigns the AID values takes the role of the AP operating device in the AID value update process that is described above.

The AID value update/change applies to the WLAN/802.11 technology and system as well as other technologies and systems where an identification number (e.g., an AID value in the case of WLAN/802.11) is assigned to a device. In other technologies and systems, the identification number might not be named as "AID", and other terminologies might be used for the unique identification number assigned to a device. The update/change of the identification numbers is performed while the devices maintain their normal operation, without a service disruption.

Generally speaking, for the WLAN/802.11 technology and system, with an AID value update after the initial assignment, the length of the TIM information element and the length of the frames (e.g., beacons, TIM Broadcast frames) containing the TIM IE, can be reduced. The reduced length of the TIM IE and the frames containing the TIM IE reduces the wake-time of power save non-AP devices (e.g., STAs) and therefore improve their power save performances. For the WLAN/802.11 technology and system, the update/change of the AID values for non-AP devices (e.g., STAs) after the initial assignment provides flexibility and other benefits, in addition to power saving, that require desired AID values for non-AP devices (e.g., STAs). The update/change of a device's identification number during its normal operation and the resulting benefits apply to the WLAN/802.11 technology and system as well as other technologies and systems.

FIG. 22, FIG. 23A, FIG. 23B, FIG. 24A, FIG. 24B, FIG. 25A, FIG. 25B, and FIG. 26 illustrate various embodiments of methods performed by one or more communication devices.

Figure 22:
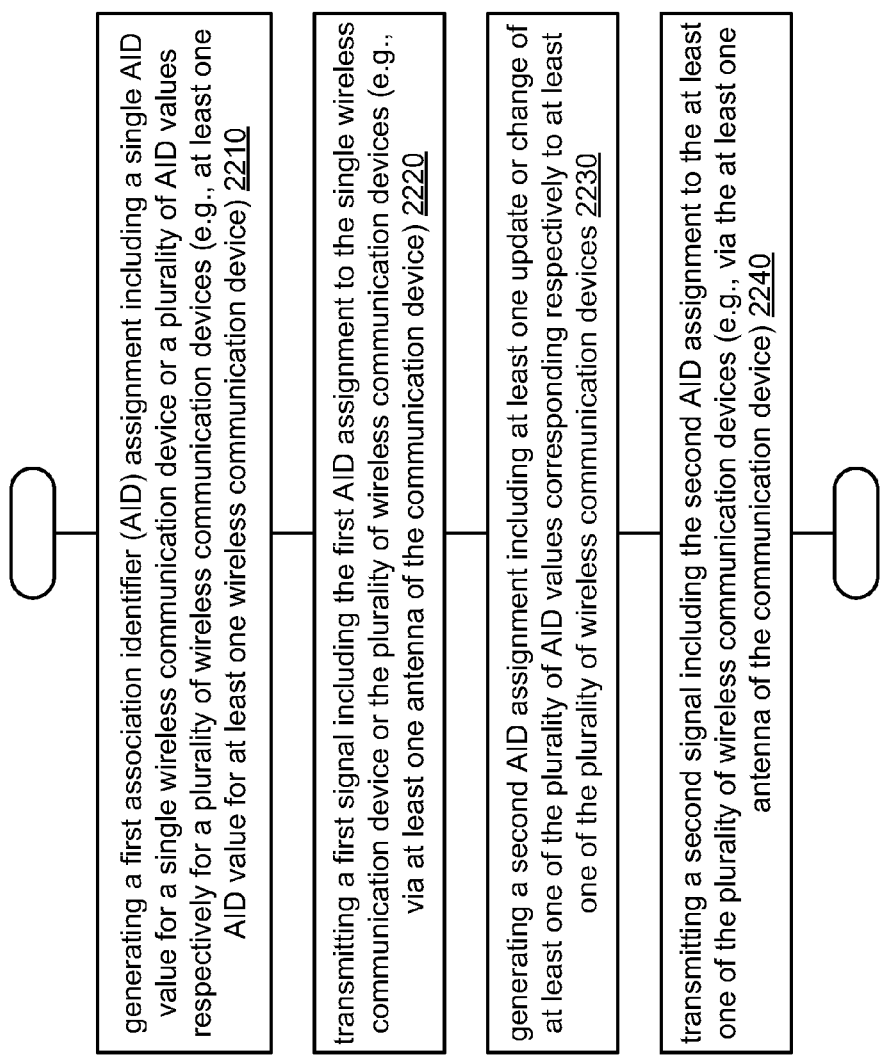

Referring to the method 2200 of FIG. 22, the method 2200 begins by generating a first association identifier (AID) assignment including a single AID value for a single wireless communication device or a plurality of AID values respectively for a plurality of wireless communication devices (e.g., at least one AID value for at least one wireless communication device), as shown in a block 2210. Via at least one antenna of the communication device, the method 2200 continues by transmitting a first signal including the first AID assignment to the single wireless communication device or the plurality of wireless communication devices (e.g., via at least one antenna of the communication device), as shown in a block 2220.

Then, method 2200 operates by generating a second AID assignment including at least one update or change of at least one of the plurality of AID values corresponding respectively to at least one of the plurality of wireless communication devices, as shown in a block 2230. Via the at least one antenna of the communication device, the method 2200 continues by transmitting a second signal including the second AID assignment to the at least one of the plurality of wireless communication devices, as shown in a block 2240.

Figure 23B:
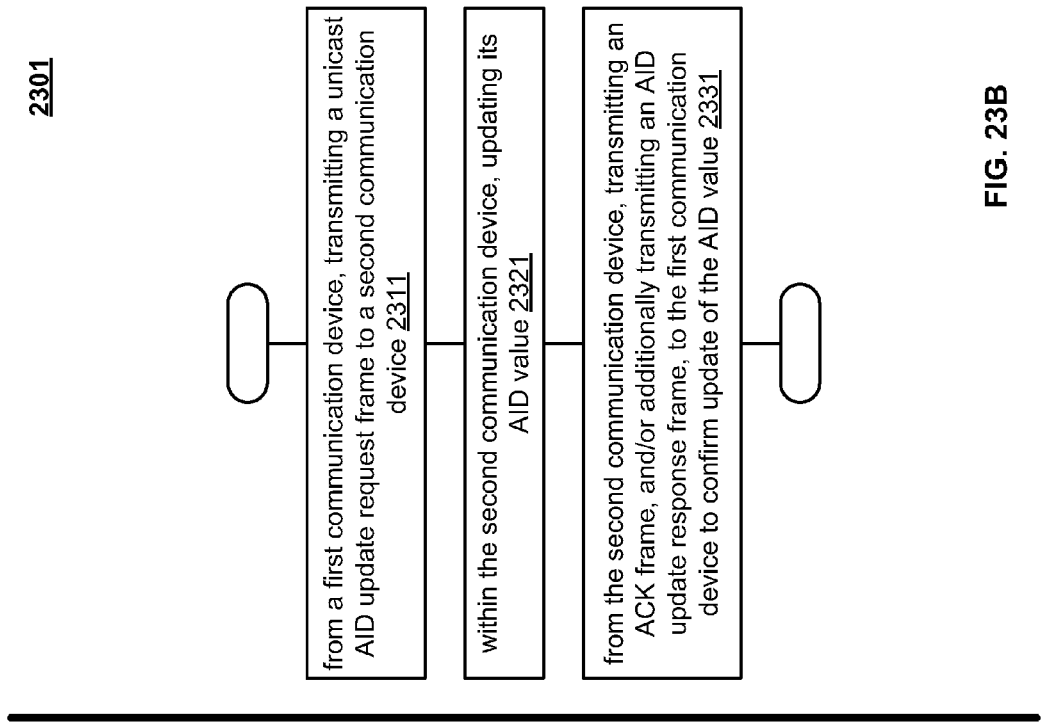
Figure 23A:
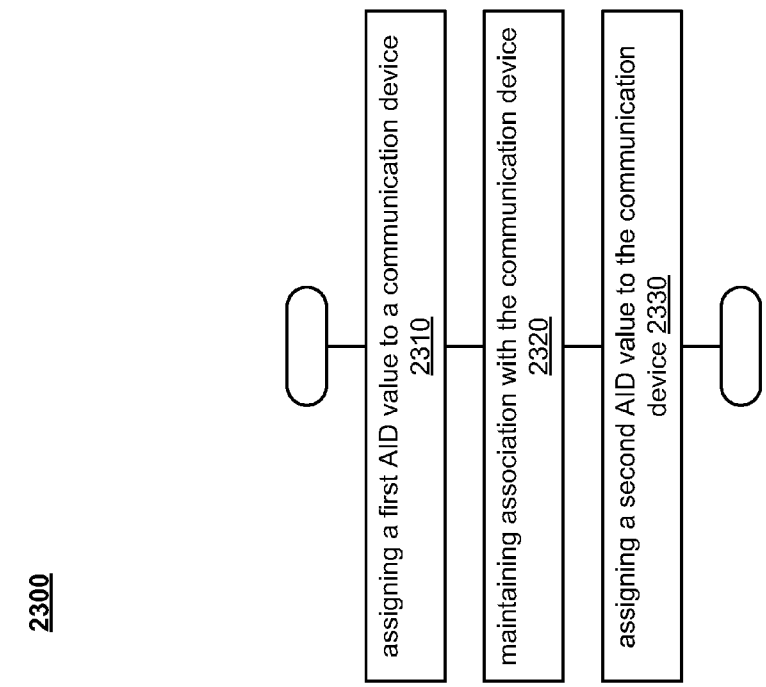

Referring to the method 2300 of FIG. 23A, the method 2300 operates by assigning a first AID value to a communication device, as shown in a block 2310. The method 2300 then operates by maintaining association with the communication device, as shown in a block 2320. For example, considering two respective communication devices (e.g., such as an AP and then STA), those two respective communication devices remain in association without de-associating and re-associating in accordance with maintaining association as shown in a block 2320.

Then, the method 2300 operates by assigning a second AID value to the communication device, as shown in a block 2330. As may be understood, the respective AID value of a given communication device may be updated even during the time in which it remains or maintains association with another communication device.

Referring to the method 2301 of FIG. 23B, from a first communication device, the method 2301 operates by transmitting a unicast AID update request frame to a second communication device, as shown in a block 2311. Then, within the second communication device, the method 2301 operates by updating its AID value, as shown in a block 2321. From the second communication device, the method 2301 operates by transmitting an acknowledgment (ACK) frame, and/or additionally an AID update response frame, to the first communication device to confirm update of the AID value, as shown in a block 2331. As may be understood with respect to this diagram, communication and coronation between different respective communication devices may be effectuated regarding requests for update of an AID value as well as communication confirming the successful update of a given AID value. Of course, more than one respective AID value may be updated in accordance with such operation including communications related to requests to update one or more AID values as well as communications related to confirmations related to successful update of one or more of those AID values. As may also be understood with respect to various embodiments and/or diagrams herein, there may be some instances in which certain AID values do not get updated (e.g., such as by the denial of update by one or more respective communication devices, or by the no-updating decision made by the first communication device).

Referring to the method 2400 of FIG. 24A, the method 2400 operates by generating a first AID assignment having a first at least one AID value corresponding respectively to a first at least one communication device, as shown in a block 2410. The method 2400 then operates by detecting a change in communication devices (e.g., additional communication device(s) joining basic services set (BSS), communication device(s) leaving BSS, etc.), as shown in a block 2420. For example, one or more additional communication devices may join the basic services set (BSS). Alternatively, one or more communication devices may depart the BSS. Generally speaking, any of a number of respective actions and/or events may occur that effectuate a change in the plurality of communication devices. However, as may be understood with respect to various embodiments and/or diagrams herein, at least one or some of the first plurality of communication devices remain continually associated even during or at the time associated with the detected change in the plurality of communication devices. That is to say, there may be one or more of the communication devices within the first plurality of communication devices that remain continually associated.

As shown in a block 2430, the method 2400 operates by generating a second AID assignment having a second at least one AID value corresponding respectively to a second at least one communication device.

As may be understood, this second at least one communication device may include more or fewer communication devices than the first at least one communication device. Also, this second AID assignment, and corresponding second at least one AID value, may include more or fewer AID values than the first AID assignment, and corresponding first at least one AID value. For example, as has been described elsewhere herein and as may be understood, one or more of the first at least one communication device may remain continually associated and become part of the second at least one communication device. In addition, in certain embodiments, as may be understood with respect to the block 2432, when an updated AID assignment corresponding to AID values is made, while at least one of the AID values therein is updated or changed, then it may also be desirable to ensure that PVB length resulting from the second assignment is shorter than the PVB length resulted from the first assignment.

Referring to the method 2401 of FIG. 24B, within a first communication device, the method 2401 operates by generating a first AID assignment having a first at least one AID value corresponding respectively to a first at least one communication device or a first plurality of AID values corresponding respectively to a first plurality of communication devices, as shown in a block 2411. From the first communication device, the method 2401 operates by transmitting a group-addressed update request frame to a subset of the first at least one communication device or the first plurality of communication devices, as shown in a block 2421. The method 2401 then operates by updating the respective AID values of the communication devices within the subset of the first at least one communication device or the first plurality of communication devices, as shown in a block 2431.

Then, from some or all of the communication devices within the subset of the first at least one communication device or the first plurality of communication devices, the method 2401 operates by transmitting a respective AID update response frame to the first communication device to confirm update of the respective AID value, as shown in a block 2441. If desired, in accordance with multiple user (MU) related communications, some or all of the communication devices within the subset of the plurality of communication devices may operate by transmitting a MU communication to the first communication device (e.g., such as in accordance with OFDMA, other MU communication protocol, etc.).

Figure 25B:
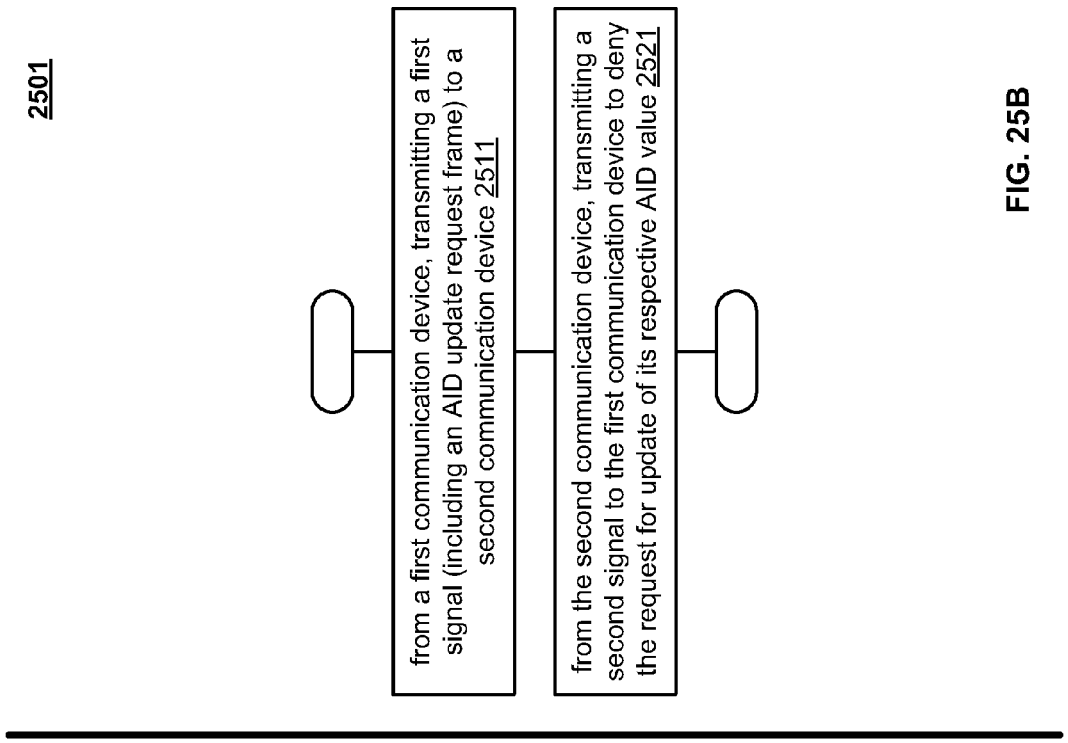
Figure 25A:
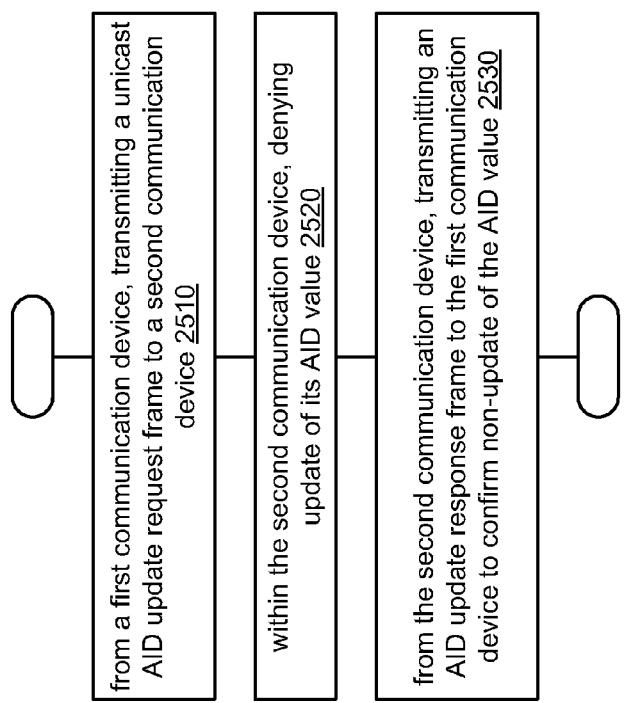

Referring to the method 2500 of FIG. 25A, from a first communication device, the method 2500 operates by transmitting a unicast AID update request frame to a second communication device, as shown in a block 2510. Within the second communication device, the method 2500 operates by denying update of its AID value, as shown in a block 2520.

Then, from the second communication device, the method 2500 operates by transmitting an AID update response frame to the first communication device to confirm non-update of the AID value, as shown in a block 2530. As may be understood with respect to this diagram, a given communication device may effectively deny that its respective AID value be updated. As such, and if desired, a respective communication may be effectuated to confirm the non-update of the respective AID value of that given communication device.

As may be understood with respect to this certain implementations of the method 2500 associated with diagram, the first communication device may be an AP, and the second communication device may be an STA. For example, within a given STA, even upon the receipt of a request to update the respective AID value thereof, that particular STA may deny the request for update of its respective AID value.

Referring to the method 2501 of FIG. 25B, from a first communication device, the method 2501 operates by transmitting a first signal (including an AID update request) to a second communication device, as shown in a block 2511. Then, from the second communication device, the method 2501 operates by transmitting a second signal to the first communication device to deny the request for update of its respective AID value, as shown in a block 2521.

As may be understood with respect to certain implementations of the method 2501 associated with diagram, the first communication device may be an STA, and the second communication device may be an AP. For example, within an AP, even upon the receipt of a request from an STA to update the respective AID value of that particular STA, the AP may deny the request for update of the respective AID value associated with that STA.

Figure 26:
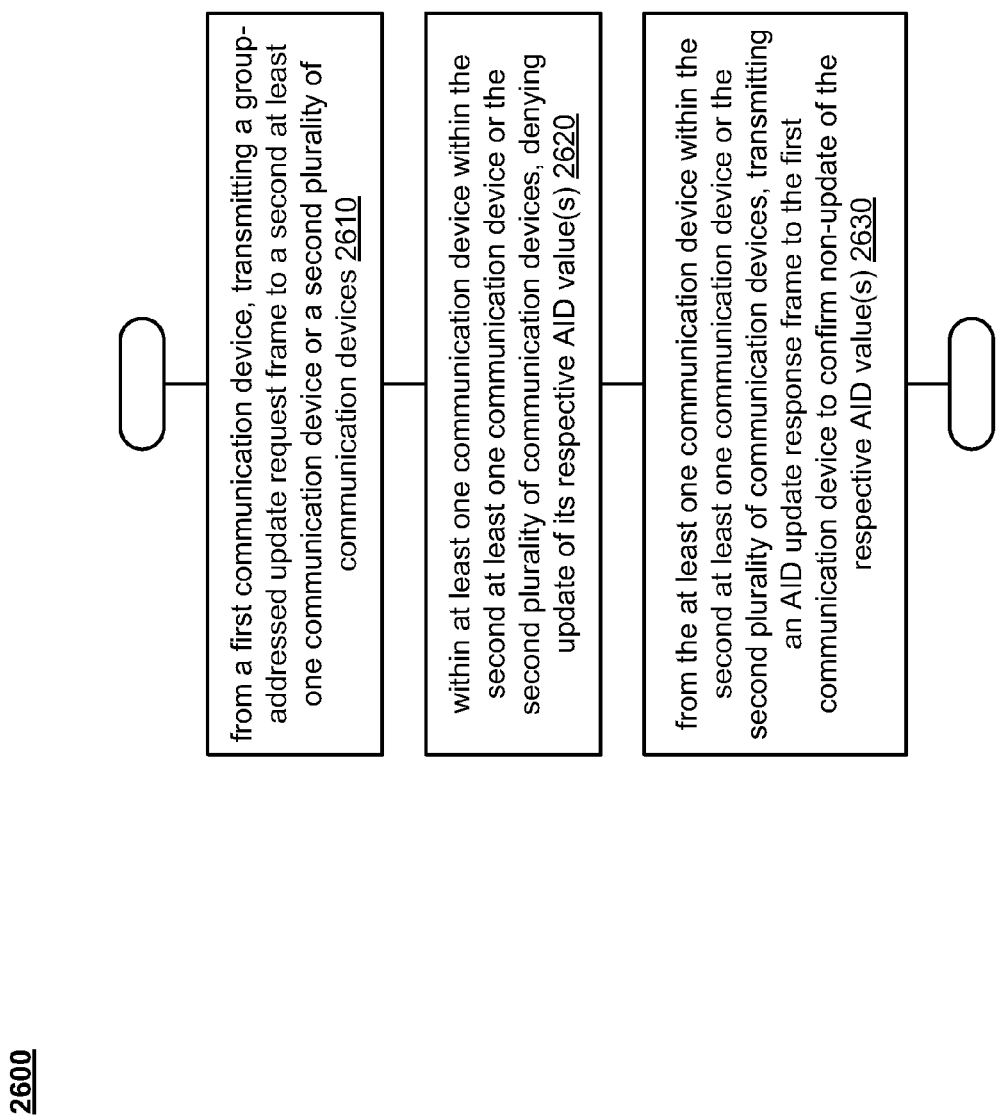
FIG. 26 illustrate various embodiments of methods performed by one or more communication devices.

Referring to the method 2600 of FIG. 26, from a first communication device, the method 2600 begins by transmitting a group-addressed update request frame to a second at least one communication device or a second plurality of communication devices, as shown in a block 2610. Within at least one communication device within the second at least one communication device or the second plurality of communication devices, the method 2600 operates by denying update of its respective AID value(s), as shown in a block 2620.

From the at least one communication device within the second at least one communication device or the second plurality of communication devices, the method 2600 continues by transmitting an AID update response frame to the first communication device to confirm non-update of the respective AID value(s), as shown in a block 2630.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
   a communication interface;
   a processor, at least one of the processor or the communication interface configured to:
   generate and transmit a first association identifier (AID) value to another wireless communication device during an association process between the wireless communication device and the another wireless communication device;
   generate and transmit a second AID value to the another wireless communication device to assign the second AID value to the another wireless communication device in place of the first AID value while the another wireless communication device remains continually associated with the wireless communication device; and generate and transmit a third AID value to the another wireless communication device to assign the third AID value to the another wireless communication device in place of the second AID value while the another wireless communication device remains continually associated with the wireless communication device, wherein the first AID value uniquely identifies the another wireless communication device during a first time, the second AID value uniquely identifies the another wireless communication device during a second time that is subsequent to the first time, and the third AID value uniquely identifies the another wireless communication device during a third time that is subsequent to the second time within a communication system that includes the wireless communication device and the another wireless communication device as the another wireless communication device remains continually associated with the wireless communication device during the first time, the second time, and the third time; and a computer usable storage memory configured to store a traffic indication virtual bitmap that uses or is based on a plurality of AID values that includes the first AID value, the second AID value, and the third AID value.

2. The wireless communication device of claim 1, wherein the at least one of the processor or the communication interface is further configured to:

transmit the second AID value within a unicast or group-addressed AID update request frame; and receive at least one AID update response frame or at least one acknowledge (ACK) frame from the another wireless communication device confirming successful update or change of the first AID value with the second AID value.

3. The wireless communication device of claim 1, wherein the at least one of the processor or the communication interface is further configured to:

transmit the first AID value within an association response frame or a re-association response frame; and transmit the second AID value within an AID update request frame.

4. The wireless communication device of claim 1 further comprising:

a cellular telephone, a two-way radio, a personal digital assistant (PDA), a personal computer (PC), a laptop computer, or a home entertainment equipment.

5. The wireless communication device of claim 1 further comprising:

an access point (AP), wherein the another wireless communication device is a wireless station (STA).

6. A wireless communication device comprising:

a communication interface;

a processor, at least one of the processor or the communication interface configured to:

generate and transmit a first association identifier (AID) value to another wireless communication device during an association process between the wireless communication device and the another wireless communication device; and generate and transmit a second AID value to the another wireless communication device to assign the second AID value to the another wireless communication device in place of the first AID value while the another wireless communication device remains continually associated with the wireless communication device, wherein the first AID value uniquely identifies the another wireless communication device during a first time and the second AID value uniquely identifies the another wireless communication device during a second time that is subsequent to the first time within a communication system that includes the wireless communication device and the another wireless communication device as the another wireless communication device remains continually associated with the wireless communication device during the first time and the second time; and a computer usable storage memory configured to store a traffic indication virtual bitmap that uses or is based on a plurality of AID values that includes the first AID value and the second AID value.

7. The wireless communication device of claim 6, wherein the at least one of the processor or the communication interface is further configured to:

remain also continually associated with the another wireless communication device when generating the first AID value and when transmitting the first AID value to the another wireless communication device.

8. The wireless communication device of claim 6, wherein the at least one of the processor or the communication interface is further configured to:

generate a third AID value to be assigned to the another wireless communication device in place of the second AID value as the another wireless communication device remains continually associated with the wireless communication device; and transmit the third AID value to the another wireless communication device, wherein the third AID value replaces the second AID value after the second AID value has replaced first AID value as the another wireless communication device remains continually associated with the wireless communication device.

9. The wireless communication device of claim 6, wherein the at least one of the processor or the communication interface is further configured to:

transmit the first AID value within an association response frame or a re-association response frame; and transmit the second AID value within an AID update request frame.

10. The wireless communication device of claim 6 further comprising:

a cellular telephone, a two-way radio, a personal digital assistant(PDA), a personal computer (PC), a laptop computer, or a home entertainment equipment.

11. The wireless communication device of claim 6, wherein the at least one of the processor or the communication interface is further configured to:

transmit the second AID value within a unicast or group-addressed AID update request frame; and receive at least one AID update response frame or at least one acknowledge (ACK) frame from the another wireless communication device confirming successful update or change of the first AID value with the second AID value.

12. The wireless communication device of claim 6, wherein the at least one of the processor or the communication interface is further configured to:

generate a fourth AID value to be assigned to the another wireless communication device as the another wireless communication device remains continually associated with the wireless communication device; and transmit the fourth AID value to the another wireless communication device as the another wireless communication device remains continually associated with the wireless communication device.

13. The wireless communication device of claim 6 further comprising:
an access point(AP), wherein the another wireless communication device is a wireless station (STA).

14. A method for execution by a wireless communication device, the method comprising:
generating a first association identifier (AID) value;
transmitting, via a communication interface of the wireless communication device, the first AID value to another wireless communication device during an association process between the wireless communication device and the another wireless communication device;
generating a second AID value;
transmitting, via the communication interface, the second AID value to the another wireless communication device, wherein the second AID value replaces the first AID value while the another wireless communication device remains continually associated with the wireless communication device, wherein the first AID value uniquely identifies the another wireless communication device during a first time and the second AID value uniquely identifies the another wireless communication device during a second time that is subsequent to the first time within a communication system that includes the wireless communication device and the another wireless communication device as the another wireless communication device remains continually associated with the wireless communication device during the first time and the second time; and
within a computer usable storage memory of the wireless communication device, storing a traffic indication virtual bitmap that uses or is based on a plurality of AID values that includes the first AID value and the second AID value.

15. The method of claim 14 further comprising:
remaining also continually associated with the another wireless communication device when generating the first AID value and when transmitting the first AID value to the another wireless communication device.

16. The method of claim 14 further comprising:
transmitting the first AID value within an association response frame or a re-association response frame; and
transmitting the second AID value within an AID update request frame.

17. The method of claim 14 wherein at least one of the wireless communication device or the another wireless communication device includes a cellular telephone, a two-way radio, a personal digital assistant(PDA), a personal computer (PC), a laptop computer, or a home entertainment equipment.

18. The method of claim 14 further comprising:
transmitting the second AID value within a unicast or group-addressed AID update request frame; and receiving at least one AID update response frame or at least one acknowledge (ACK) frame from the another wireless communication device confirming successful update or change of the first AID value with the second AID value.

19. The method of claim 14 further comprising:
generating a third AID value to be assigned to the another wireless communication device in place of the second AID value as the another wireless communication device remains continually associated with the wireless communication device; and
transmitting the third AID value to the another wireless communication device, wherein the third AID value replaces the second AID value after the second AID value has replaced first AID value as the another wireless communication device remains continually associated with the wireless communication device.

20. The method of claim 14, wherein the wireless communication device is an access point (AP), and the another wireless communication device is a wireless station (STA).

* * * * *